United States Patent
Kikuchi et al.

(10) Patent No.: US 9,709,695 B2
(45) Date of Patent: Jul. 18, 2017

(54) SENSOR APPARATUS AND HAZARD SENSING SYSTEM

(71) Applicant: OMRON Corporation, Kyoto-shi, Kyoto (JP)

(72) Inventors: Keisaku Kikuchi, Kusatsu (JP); Kazunori Osako, Otsu (JP); Motohiro Yamanishi, Kyoto (JP); Paolo Viviani, Villastellone (IT); Enzo Romano, Moncalieri (IT)

(73) Assignee: OMRON Corporation, Kyoto-shi (JP)

( * ) Notice: Subject to any disclaimer, the term of this patent is extended or adjusted under 35 U.S.C. 154(b) by 9 days.

(21) Appl. No.: 14/860,737

(22) Filed: Sep. 22, 2015

(65) Prior Publication Data

US 2016/0097878 A1   Apr. 7, 2016

(30) Foreign Application Priority Data

Oct. 3, 2014 (EP) .................................... 14425123

(51) Int. Cl.
  *G01V 8/10*  (2006.01)
  *G01V 8/20*  (2006.01)
  *F16P 3/14*  (2006.01)

(52) U.S. Cl.
  CPC .............. *G01V 8/20* (2013.01); *F16P 3/144* (2013.01)

(58) Field of Classification Search
  CPC ... G01V 8/10; G01V 8/12; G01V 8/20; G08B 13/181; G08B 13/183; G08B 21/00; G08B 21/02

USPC ............... 250/221, 222.1; 340/552, 555, 556
See application file for complete search history.

(56) References Cited

U.S. PATENT DOCUMENTS

| | | | |
|---|---|---|---|
| 5,149,921 A | 9/1992 | Picado | |
| 8,471,192 B2 | 6/2013 | Erb et al. | |
| 2008/0179505 A1* | 7/2008 | Inoue | G01V 8/20 250/221 |
| 2009/0058642 A1* | 3/2009 | Fukumura | G01V 8/20 340/556 |
| 2011/0095170 A1 | 4/2011 | Erb et al. | |
| 2013/0278423 A1 | 10/2013 | Chen et al. | |
| 2014/0002264 A1 | 1/2014 | Kikuchi et al. | |

FOREIGN PATENT DOCUMENTS

| | | |
|---|---|---|
| EP | 2037297 B1 | 3/2011 |
| EP | 2418517 A2 | 2/2012 |

\* cited by examiner

*Primary Examiner* — Kevin Pyo
(74) *Attorney, Agent, or Firm* — Mots Law, PLLC

(57) ABSTRACT

A sensor apparatus includes multiple pairs that each include a light emitting element and a light receiving element configured to receive light emitted from the light emitting element, and, in response to optical axes formed in a region between the light emitting elements and the light receiving elements entering a blocked state, senses a sensing target moving in the region. In an initial state, sensing is performed using a sensing optical axis composed of a portion of the optical axes, and when an optical axis of the sensing optical axis used in sensing in the initial state is blocked, the number of optical axes included in the sensing optical axis is increased so as to expand the sensing optical axis.

8 Claims, 20 Drawing Sheets

FIG. 4

| | State | Position of work piece | Detected abnormality |
|---|---|---|---|
| Before muting | Stage 1<br><br>A off<br>B off<br>LC not blocked | 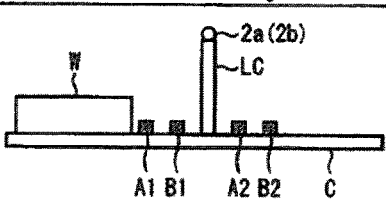 | • B switches on before A switches on<br>• A and B switch on at the same time |
| | Stage 2<br><br>A on<br>B off<br>LC not blocked | 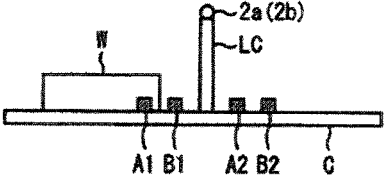 | • B switches on before the minimum wait time elapses<br>• B does not switch on even though maximum wait time has elapsed |
| | Stage 3<br><br>A on<br>B on<br>LC not blocked | 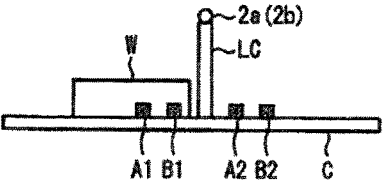 | • LC is blocked before time T elapses |
| During muting | Stage 4<br><br>A on<br>B on<br>LC not blocked<br>(Time T has elapsed since stage 3) | 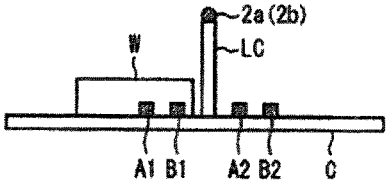 | • LC is blocked before the minimum wait time elapses<br>• LC is not blocked even though maximum wait time has elapsed |
| | Stage 5<br><br>A on<br>B on<br>LC blocked | 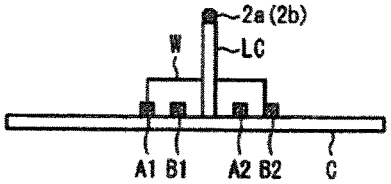 | • LC is unblocked before minimum wait time elapses<br>• LC is not unblocked even though maximum wait time has elapsed |
| | Stage 6<br><br>A on<br>B on<br>LC not blocked | 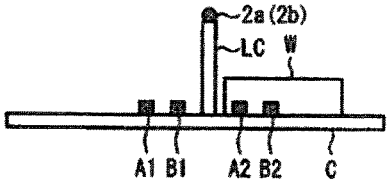 | • A switches off before minimum wait time elapses<br>• A does not switch off even though maximum wait time has elapsed |
| Ending muting | Stage 7<br><br>A off<br>B on<br>LC not blocked | 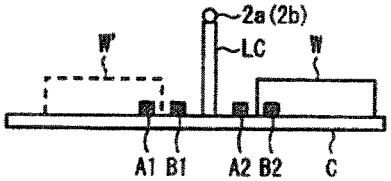 | • A switches on before B switches off |

SENSOR APPARATUS AND HAZARD SENSING SYSTEM

FIELD

The present invention relates to a sensor apparatus that includes multiple pairs that each include a light emitting element and a light receiving element, and is configured to, in response to an optical axis formed in a region between a light emitting element and a light receiving element entering a blocked state, sense a sensing target moving in the region. The present invention also relates to a hazard sensing system including the sensor apparatus.

BACKGROUND

Conventionally, sensor apparatuses including a multi-optical-axis photoelectric sensor have been used as sensor apparatuses for sensing a sensing target in various types of manufacturing equipment.

An ordinary multi-optical-axis photoelectric sensor includes a light projecting unit in which multiple light emitting elements are arranged linearly, and a light receiving unit in which the same number of light receiving elements as the light emitting elements are arranged linearly, and the light emitting elements and light receiving elements are arranged so as to face each other in a one-to-one relationship. Also, the light projecting unit and the light receiving unit are generally synchronized using communication. The light emitting elements are caused to sequentially emit light on the light projecting unit side, and received amounts of light at timings synchronized with the light emission operations of the light emitting elements are acquired from the light receiving elements corresponding to the light emitting elements on light receiving unit side. Accordingly, blocked states of each optical axis of the multi-optical-axis photoelectric sensor are detected in sequence.

Also, a muting function of temporarily disabling an emergency stop function of the manufacturing equipment when a predetermined condition is satisfied has conventionally been used as a function for achieving both safety and productivity at production sites.

FIG. 18 is a diagram for illustrating an example of a conventional sensor apparatus 100 that includes a hazard sensing sensor (multi-optical-axis photoelectric sensor) and a muting sensor (single-optical-axis sensor).

The sensor apparatus 100 shown in the drawing includes a hazard sensing sensor 101, display lamps 102a and 102b, and muting sensors (single-optical-axis sensors) 103 to 106.

The hazard sensing sensor 101 includes a light projecting unit 101a in which multiple light emitting elements are arranged linearly, and a light receiving unit 101b in which the same number of light receiving elements as the light emitting elements are arranged linearly, and the light emitting elements and the light receiving elements are arranged on opposite sides of a conveyance apparatus C conveying a work piece W, and face each other in a one-to-one relationship. Also, a safety function (e.g., an emergency stop function) is activated when the hazard sensing sensor 101 senses an object.

The muting sensors 103 to 106 are arranged upstream and downstream of the hazard sensing sensor 101 in the conveyance direction of the work piece W at a predetermined interval, and signals therefrom are input to the hazard sensing sensor 101. Also, if the sensing result of the muting sensors 103 to 106 satisfies a sensing condition set in advance according to the size, shape, conveyance interval, and the like of the work piece W, a muting function of disabling the emergency stop function of the manufacturing equipment is executed.

Note that in general, the muting function is disabled only while multiple independent muting signals (signals of single-optical-axis sensors, etc.) continue to be input in a predetermined sequence. Also, in the interest of safety, there is a need for an arrangement where the muting signal actually detects the work piece. For this reason, the stability of the muting function largely depends on the performance and stability of the muting signals from the external devices (single-optical-axis sensors, etc.).

Also, EP 2037297B discloses that a multi-optical-axis photoelectric sensor is arranged in a horizontal direction (arranged so that light emitting elements and light receiving elements are aligned along the conveyance direction of a work piece), and the work piece is sensed according to the result of the multi-optical-axis photoelectric sensor receiving light.

EP 2037297B is an example of background art.

SUMMARY

In recent years, applications for muting functions have become more advanced, and there has been demand to achieve both productivity and safety also in the case of more complex work piece shapes (e.g., a shape with holes, cut-out portions, or the like, an indeterminate shape, etc.), in cases where vibration of the work piece occurs, in cases where the movement speed of the work piece varies, and in cases where work pieces accumulate as the size of the equipment decreases, for example.

For this reason, with the method of executing the muting function based on the result of the above-described single-optical-axis photoelectric sensor detecting a work piece, there are cases where the problems indicated in (1) and (2) below occur, and the muting function does not function normally, which leads to a decrease in productivity.

(1) In some cases, work pieces cannot be detected continuously or stably due to multiple holes that are present in the work pieces, or irregularity in the shape of the work pieces. Also, it is necessary to change the setup each time the work piece changes.

(2) In some cases, if the speed of a work piece suddenly decreases or the like near a sensing area of the single-optical-axis photoelectric sensor, the work piece will shake significantly and stable detection is not possible (in some cases, chattering occurs and a signal cannot be supplied continuously).

The present invention has been made in view of the foregoing problems and it is an object thereof to provide a sensor apparatus that can appropriately sense a sensing target regardless of the shape of the sensing target or the existence of vibration, and to provide a hazard sensing system that includes the sensor apparatus.

A sensor apparatus according to an embodiment of the present invention includes: a light projecting unit having a plurality of light emitting elements; a light receiving unit having a plurality of light receiving elements that correspond to the plurality of light emitting elements, each of the plurality of light receiving elements being configured to receive light emitted by a corresponding light emitting element and generate a light reception signal; a control unit having a first mode in which at least one of a plurality of optical axes formed by the corresponding light emitting elements and light receiving elements is used as a sensing optical axis, and a second mode in which an additional sensing optical axis is set by adding an optical axis other than the sensing optical axis of the first mode to the optical axis used as the sensing optical axis in the first mode, the control unit being configured to determine a non-sensing state and a sensing state based on the light reception signal of each light receiving element serving as a sensing optical axis in the respective modes; and an output unit configured to perform output according to the determination result of the control unit, wherein the control unit switches to the second mode when a change from a non-sensing state, in which the light reception signals of the light receiving elements for all of the sensing optical axes of the first mode are signals corresponding to a light receiving state, to a sensing state, in which a light reception signal of the light receiving element for at least one of the sensing optical axes of the first mode is a signal corresponding to a blocked state, occurs in the first mode.

According to the above-described configuration, the number of sensing optical axes is automatically increased when a sensing target reaches the sensing optical axis in an initial state. Accordingly, it is possible to appropriately sense a sensing target moving between a light emitting element and a light receiving element, regardless of the shape of the sensing target and the existence of vibration.

Also, a configuration is possible in which the plurality of optical axes are aligned along the movement direction of the sensing target and the sensing optical axes of the second mode include an optical axis located in a direction opposite to the movement direction with respect to the sensing optical axis of the first mode.

According to the above-described configuration, even in the case where vibration in the movement direction of the sensing target occurs, and in the case where the sensing target has a complex shape such as a hole or a cut-out portion, a plurality of sensing optical axes can be arranged over a range that is wider than the vibration width and the size of the hole, and therefore it is possible to stably sense a sensing target when a sensing target intrudes.

Also, a configuration is possible in which the plurality of optical axes are aligned along a movement direction of the sensing target, and the sensing optical axes of the second mode include an optical axis located in the movement direction with respect to the sensing optical axis of the first mode.

According to the above-described configuration, even in the case where vibration in the movement direction of the sensing target occurs, and in the case where the sensing target has a complex shape such as a hole or a cut-out portion, a plurality of sensing optical axes can be arranged over a range that is wider than the vibration width and the size of the hole, and therefore it is possible to stabilize sensing when a sensing target passes through the sensing optical axis.

Also, a configuration is possible in which the plurality of light emitting elements and light receiving elements are linearly arranged in respective rows, and the light projecting unit and the light receiving unit are arranged such that the alignment direction of the light emitting elements and the alignment direction of the light receiving elements form an angle that is greater than 0 degrees and less than 90 degrees with respect to the movement direction of the sensing target.

According to the above-described configuration, due to being arranged such that the alignment direction of the light emitting element and the alignment direction of the light receiving element form an angle that is greater than 0 degrees and less than 90 degrees with respect to the movement direction of the sensing target, it is possible to stably sense the sensing target even in the case where hole portions, cut-out portions, and the like that are wider in the movement direction and the direction perpendicular to the optical axes are present in the sensing target. Also, even if a hole portion or a cut-out portion is present in the sensing target and vibration occurs in the movement direction, it is not necessary to arrange the optical axes in the movement direction and the direction perpendicular thereto, and thus it is possible to sense a sensing target using a small number of optical axes.

Also, a configuration is possible in which the control unit switches to the first mode when a change from a sensing state, in which a reception signal of a light receiving element for at least one of the sensing optical axes of the second mode is a signal corresponding to a blocked state, to a non-sensing state, in which the light reception signals of the light receiving elements of all of the optical axes in the sensing optical axis of the second mode are signals corresponding to a light receiving state, occurs in the second mode.

According to the above-described configuration, it is possible to automatically return to the initial state (first mode) when a sensing target is no longer present.

Also, a configuration is possible in which the control unit is configured to set a plurality of sensing optical axes of the first mode at a plurality of positions with different optical axes, and in the second mode, the control unit is configured to set the plurality of sensing optical axes of the second mode, which are obtained by adding optical axes other than the sensing optical axes of the first mode to the plurality of sensing optical axes of the first mode, and the output unit outputs the determination results corresponding to the plurality of sensing optical axes.

According to the above-described configuration, by setting a plurality of sensing optical axes in the movement direction, it is possible to cause sensing results to be output such that a time difference is generated by the intruding sensing target in the sensing optical axes. Also, by making it possible to select the setting position of the sensing optical axes, it is possible to easily arrange a time interval for a plurality of outputs generated according to the movement of the sensing target.

Also, a configuration is possible in which in the first mode, the sensing optical axis includes a plurality of optical axes and the control unit determines that a sensing target has been sensed when a predetermined number of the sensing optical axes in the sensing optical axis are blocked in the first mode, and in the second mode, the control unit determines that a sensing target has been sensed when one of the sensing optical axes is blocked.

According to the above-described configuration, it is possible to stably sense an intrusion of a sensing target having a predetermined shape.

A hazard sensing system of the present invention includes a hazard sensing sensor, and any of the above-mentioned sensor apparatuses, in which the output unit performs output corresponding to the determination result in a muting input of the hazard sensing sensor.

According to the above-described configuration, it is possible to appropriately sense a sensing target and appropriately perform muting processing according to the sensing result. Accordingly, for example, it is possible to prevent the manufacturing equipment from being stopped due to incorrect sensing and to improve productivity.

According to the above-described sensor apparatus, a sensing target moving between a light emitting element and a light receiving element can be appropriately sensed with-

BRIEF DESCRIPTION OF THE DRAWINGS

FIG. 4 is a diagram for illustrating an example of a method for controlling a muting function of the hazard sensing system in FIG. 1.

DETAILED DESCRIPTION

Embodiments of the present invention will be described below.

1-1. Overall Configuration of Hazard Sensing System S

Figure 1:
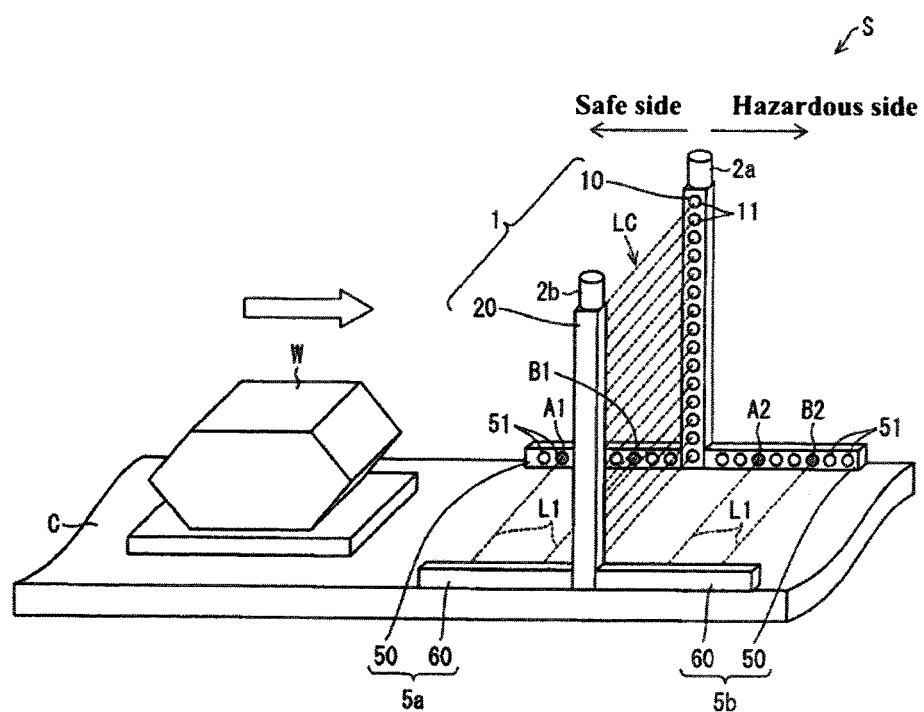
FIG. 1 is a diagram for illustrating an example of installation of a hazard sensing system according to an embodiment of the present invention.

FIG. 1 is a diagram for illustrating an example of installation of a hazard sensing system S according to the present embodiment. As shown in this drawing, the hazard sensing system S includes a hazard sensing sensor 1, display lamps 2a and 2b, and muting sensors (sensor apparatuses) 5a and 5b.

The hazard sensing sensor 1 includes a light projector 10 and a light receiver 20 that are arranged facing each other on opposite sides of the conveyance route of a conveyance device C that conveys a work piece (sensing target) W from a safe side to a hazardous side. Multiple light emitting elements 11 are arranged linearly in a vertical direction in the light projector 10, and the same number of light receiving elements 21 (see later-described FIG. 2) as light emitting elements 11 are arranged facing the light emitting elements 11 in a one-to-one relationship so as to form optical axes in the light receiver 20. Accordingly, a two-dimensional sensing area LC along the vertical direction formed by the multiple optical axes is set.

A muting sensor (muting trigger apparatus) 5a includes a light projector 50 and a light receiver 60 that are arranged upstream of the hazard sensing sensor 1 in the conveyance direction of the conveyance device C, and are arranged facing each other on opposite sides of the conveyance device C. The light projector 50 is an example of a light projecting unit, and the light receiver 60 is an example of a light receiving unit. Multiple light emitting elements 51 are arranged linearly in a horizontal direction in the light projector 50, and the same number of light receiving elements 61 (see later-described FIG. 5) as the light emitting elements 51 are arranged in a one-to-one relationship opposite the light emitting elements 51 so as to form optical axes L1 in the light receiver 60. That is to say, the muting sensor 5a includes multiple pairs that each include a light emitting element 51 and a light receiving element 61.

Similarly, a muting sensor (muting trigger apparatus) a includes a light projector 50 and a light receiver 60 that are arranged downstream of the hazard sensing sensor 1 in the conveyance direction of the conveyance device C, and are arranged facing each other on opposite sides of the conveyance device C. The light emitting elements 51 are arranged linearly in a horizontal direction in the light projector 50, and the same number of light receiving elements 61 (see later-described FIG. 5) as the light emitting elements 51 are arranged in a one-to-one relationship opposite the light emitting elements 51 so as to form optical axes L1 in the light receiver 60.

A detection signal (abnormality sensing signal) that is output by the hazard sensing sensor 1 when intrusion of an object into the sensing area LC (sensing region) is detected is output to a power supply circuit (not shown) of the manufacturing equipment in the hazardous region so that the supply of power to the manufacturing equipment is stopped. Note that in the present embodiment, during a period of sensing a normal state in which the optical axes of the muting sensors 5a and a are blocked in a pre-determined sequence, the muting function operates so that the manufacturing equipment does not stop even if the detection signal is disabled and the hazard sensing sensor 1 senses an object.

The display lamps 2a and 2b are provided on the upper portions of the housings of the light projector 10 and the light receiver 20 respectively, are illuminated (i.e. alight continuously) during muting, and flash when an abnormality occurs (when an object is detected by the hazard sensing sensor 1 during non-muting).

1-2. Configuration of Hazard Sensing Sensor 1

Figure 2:
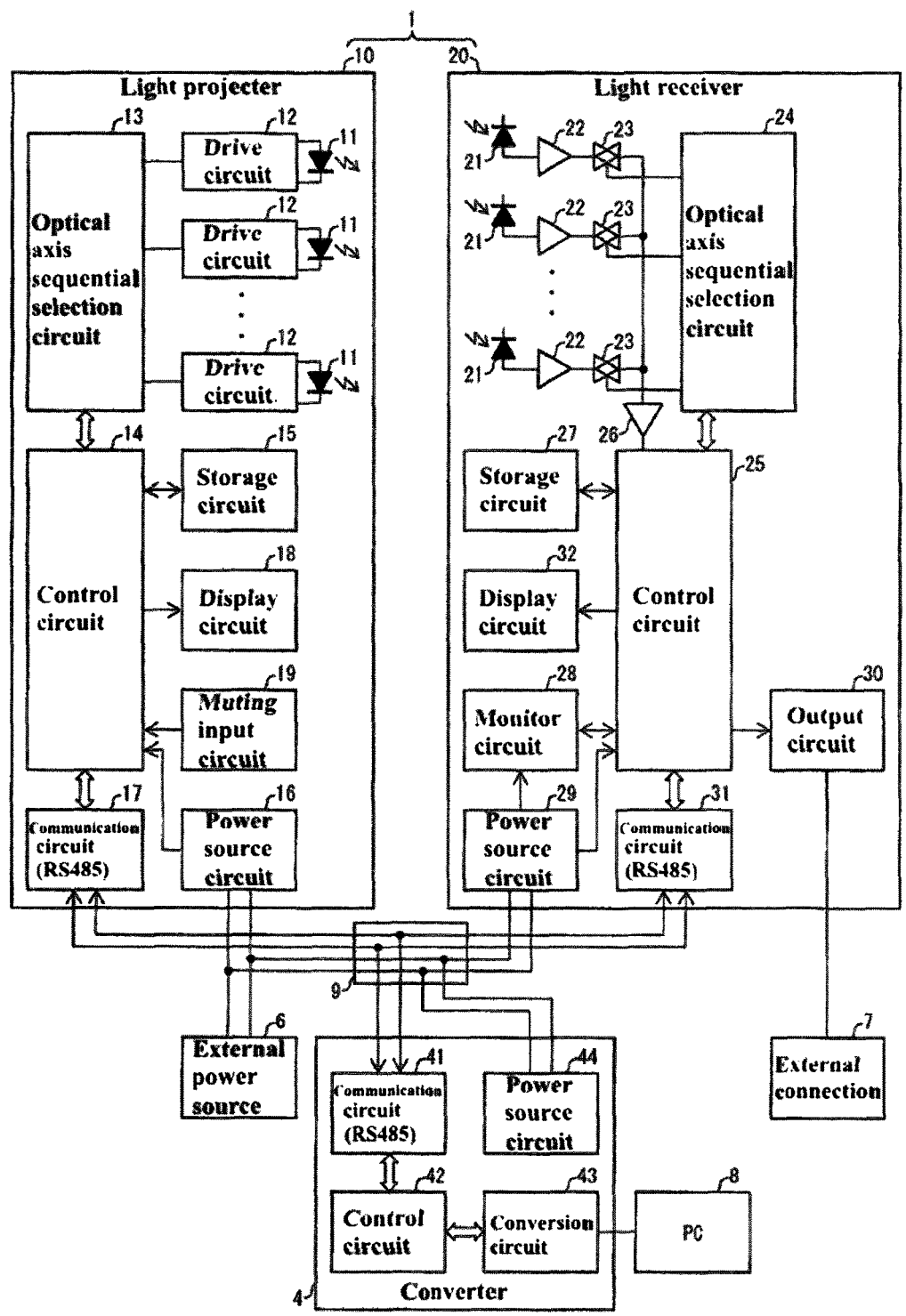
FIG. 2 is a block diagram showing a configuration of a hazard sensing sensor included in the hazard sensing system of FIG. 1.

FIG. 2 is a block diagram showing the configuration of the hazard sensing sensor 1.

Multiple light emitting elements 11 composed of LEDs, drive circuits 12 provided for each light emitting element 11, an optical axis sequential selection circuit 13, a control circuit 14, a storage circuit 15, a power source circuit 16, a communication circuit 17, a display circuit 18, and the like are provided in the housing of the light projector 10.

Multiple light receiving elements 21 composed of photo diodes, amplifiers 22 and analog switches 23 provided for each light receiving element 21, an optical axis sequential selection circuit 24, a control circuit 25, an amplifier 26 provided on the output line from the analog switches 23 to the control circuit 25, a storage circuit 27, a monitor circuit 28, a power source circuit 29, an output circuit 30, a communication circuit 31, a display circuit 32, and the like are provided in the housing of the light receiver 20.

The communication circuits 17 and 31 are compliant with the RS485 standard. The power source circuits 16 and 29 each receive a supply of power from a common external power source 6 and generate power for allowing the circuits in the housings to operate. The control circuits 14 and 25 are microcomputers that operate at the same timing by communicating with each other via the communication circuits 17 and 31. The display circuits 18 and 32 control the above-described display lamps 2a and 2b.

The output circuit 30 in the light receiver 20 is connected to a switch mechanism (not shown) that is built into the power supply circuit to the manufacturing equipment in the hazardous region. As long as the output from the output circuit 30 is on (high-level), the switch mechanism is closed and power is supplied to the manufacturing equipment in the hazardous region. However, if the output from the output circuit 30 is off (low-level), the switch mechanism opens, and the manufacturing equipment is stopped.

The optical axis sequential selection circuits 13 and 24 of the light projector 10 and the light receiver 20 are gate circuits for enabling the optical axes one-by-one. The control circuits 14 and 25 of the light projector 10 and the light receiver 20 each emit a timing signal, switching the selection of the optical axis in the optical axis sequential selection circuits 13 and 24 at synchronized timings by communicating with each other. Accordingly, the light emitting elements 11 for the optical axes of the light projector 10 are illuminated in sequence, and in coordination with this, received light amount signals generated in the light receiving elements 21 corresponding to the illuminated light emitting elements 11 are input to the control circuit 25 in the light receiver 20.

The control circuits 14 and 25 determine whether the optical axes are unobstructed or blocked by comparing the received light amount of the optical axis with a predetermined threshold value. Furthermore, the control circuits 14 and 25 determine the overall light passage/blocking of the sensing area LC by aggregating the determination results for each time the set of optical axes has been cycled through.

The storage circuits 15 and 27 store programs and various parameters needed for the operation of the control circuits 14 and 25, abnormality sensing record data, and the like.

The communication line between the light projector 10 and the light receiver 20, and the power source line between the external power source 6 and the power source circuits 16 and 29 are connected to a converter 4 via a branching connector 9.

An RS485 communication circuit 41, a control circuit 42, a conversion circuit 43, a power source circuit 44, and the like are provided in the converter 4. The communication line and the power source line between the light projector 10 and the light receiver 20 are branched by the branching connector 9 and the branching path of the communication line is connected to the communication circuit 41 of the converter 4, and the branching path of the power source line is connected to the power source circuit 44.

The power source circuit 44 receives a supply of power from the external power source 6 via the branched power source line and generates power for causing the circuits in the converter 4 to operate. The conversion circuit 43 has a function of converting RS485 signals handled by the control circuits 14 and 25 of the light projector 10 and the light receiver 20 into RS282C or USB signals, and vice versa. An RS282C or USB port is connected to a PC (personal computer) 8.

The PC 8 is connected during the setting of operations of the hazard sensing sensor 1, in the case where a user wishes to check the operation state of the hazard sensing sensor 1, or the like. If a user performs an operation for a setting relating to the operation of the hazard sensing sensor 1 (includes settings related to muting) on the PC 8, the set information is provided to the control circuits 14 and 25 of the light projector 10 and the light receiver 20 via the converter 4 and the communication circuits 17 and 31, and it is registered in the storage circuits 15 and 27. Also, in the PC 8, in the case where an operation for designating the reading-out of information stored in the storage circuits 15 and 27 has been performed, a command accompanying the operation is provided to the control circuits 14 and 25 of the light projector 10 and the light receiver 20 using the same route as described above, and information read out from the storage circuits 15 and 27 according to the command by the control circuits 14 and 25 is transferred to the PC 8 by a route that is the reverse of that described above.

A muting input circuit 19 of the light projector 10 receives a detection signal from the muting sensors 5a and 5b. Note that although the muting input circuit 19 is provided in the light projector 10 in the present embodiment, there is no limitation to this, and it may be provided in the light receiver 20, for example.

Figure 3:
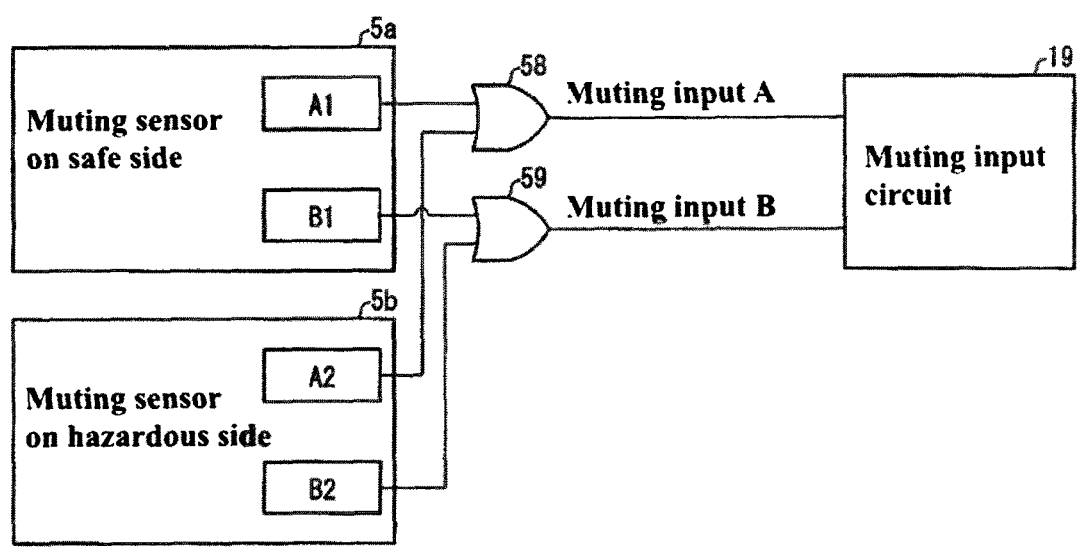
FIG. 3 is a diagram for illustrating a connection relationship between a muting sensor included in the hazard sensing system shown in FIG. 1, and a muting input circuit included in the hazard sensing sensor in FIG. 2.

FIG. 3 is a diagram for illustrating a connection relationship between the muting sensors 5a and a and the muting input circuit 19.

In the present embodiment, a portion of the multiple optical axes L1, L1, . . . of the muting sensor 5a are allowed to function as a trigger channel (sensing optical axis) A1, and another portion is allowed to function as a trigger channel (sensing optical axis) B1, although the details of this will be described later. Also, a portion of the multiple optical axes L1, L1, . . . of the muting sensor a are allowed to function as a trigger channel (sensing optical axis) A2, and another portion is allowed to function as a trigger channel (sensing optical axis) B2. Also, the output from the trigger channels A1 and A2 are input to the muting input circuit 19 via an OR circuit 58 (muting input A), and the output from the trigger channels B1 and B2 is input to the muting input circuit 19 via an OR circuit 59 (muting input B). Note that in the present embodiment, the OR circuits (muting processing units) 58 and 59 are provided in a later-described output circuit 69. However, there is no limitation to this, and the OR circuits 58 and 59 may be provided in the hazard sensing sensor 1, and they may be provided in another device included between the output circuit 69 of the muting sensors 5a and a and the hazard sensing sensor 1.

The above-described signals (muting inputs A and B) input to the muting input circuit 19 are input to the control circuit 14 on the light projector 10 side, and are further transferred to the control circuit 25 on the light receiver 20 side via the communication circuits 17 and 31.

The control circuits (muting processing units) 14 and 25 control the switching on/off of the muting function based on the muting inputs A and B. In other words, the control circuits 14 and 25 start the muting when the output from the multiple muting sensors 5a and 5b is input in a predetermined start sequence, end the muting when input is received in a pre-determined end sequence, and from the time when the muting starts until the time when the muting ends, disable the function of stopping the manufacturing equipment based on the result of sensing by the hazard sensing sensor 1. The disabling processing is the muting processing. Accordingly, even if a blocked state of the sensing area LC is detected during muting, the output stop function is not started, and the output circuit 30 is kept in a state of outputting high-level signals.

1-3. Method for Controlling Muting Function

FIG. 4 is a diagram for illustrating an example of a method for controlling a muting function. Note that in FIG. 4, the muting inputs A and B are indicated as simply "A" and "B", and the sensing area LC is indicated as simply "LC".

In the example shown in FIG. 4, the sequence for muting is divided into seven stages.

Stage 1 corresponds to a state at the time when a work piece W is located further upstream than the trigger channels A1 and B1 on the safe side.

Stage 2 corresponds to a state in which the work piece W has advanced to a position of blocking the optical axis of the trigger channel A1, which is further upstream on the safe side.

Stage 3 corresponds to a state in which the work piece W has advanced to a position of blocking the optical axis of the trigger channel B1, which is further downstream on the safe side. Also, in this embodiment, muting starts when a pre-determined amount of time T has elapsed since Stage 3 was entered.

Stage 4 corresponds to a state at the time when the muting is started. At this stage, the work piece W has not yet reached the sensing area LC.

Stage 5 corresponds to a state in which the sensing area LC is blocked by the work piece W.

Stage 6 corresponds to a state in which the work piece W has passed through the sensing area LC and is blocking the optical axes of the trigger channels A2 and B2 on the hazardous side. In this embodiment, muting ends when the work piece W further advances from the state of Stage 6 and the optical axis of the trigger channel A2 is not blocked (i.e., when the muting input A is switched from on to off).

Stage 7 corresponds to a state at the time of ending muting.

As shown in FIG. 4, normally, in the stages other than Stage 5, the sensing area LC is not blocked. Also, in the present embodiment, the interval between the trigger channels A1 and A2 and the interval between the trigger channels B1 and B2 are set to be shorter than the length of the work piece W in the conveyance direction. Accordingly, during the period from when Stage 3 is started until when Stage 6 ends, the muting inputs A and B are normally always in an on state.

Main abnormality detection processing in each stage will be described next.

In Stage 1, a case where the muting inputs A and B undergo a change that does not satisfy the conditions for proceeding to Stage 2 and Stage 3 is detected as an abnormality. Also, in Stage 2, a case where an item indicating subsequent procession to Stage 3 (a case where the muting input B switches from off to on) occurs before a predetermined minimum wait time has elapsed, and a case where the muting input B does not switch even after a predetermined maximum wait time has elapsed are detected as abnormalities.

In Stage 3, a case where the sensing area LC is blocked before the wait time T elapses, which is a condition for subsequent procession to Stage 4, is detected as an abnormality. In Stage 4, Stage 5, and Stage 6, similarly to Stage 2, a case where an event indicating procession to a subsequent stage occurs before the predetermined minimum wait time has elapsed, and a case where the event does not occur even after a predetermined maximum wait time has elapsed are detected as abnormalities. Note that the minimum wait time and the maximum wait time can be set individually for each stage.

In Stage 7, a case where the muting input A once again enters the on state before the muting input B is switched off is detected as an abnormality.

Also, in the stages other than Stage 5, a case where the sensing area LC is blocked is detected as an abnormality. Also, if the optical axes blocked by a work piece W having a specific shape have been registered in order to allow only that work piece W to pass, in Stage 5, a case where an unregistered optical axis in the sensing area LC is blocked, or a case where a registered optical axis is not blocked may be detected as an abnormality.

Furthermore, in Step 2 to Step 6, a case where one of the muting inputs A and B that is to be kept in the on state switches to the off state is detected as an abnormality.

1-4. Configuration of Muting Sensors 5a and 5b

Figure 5:
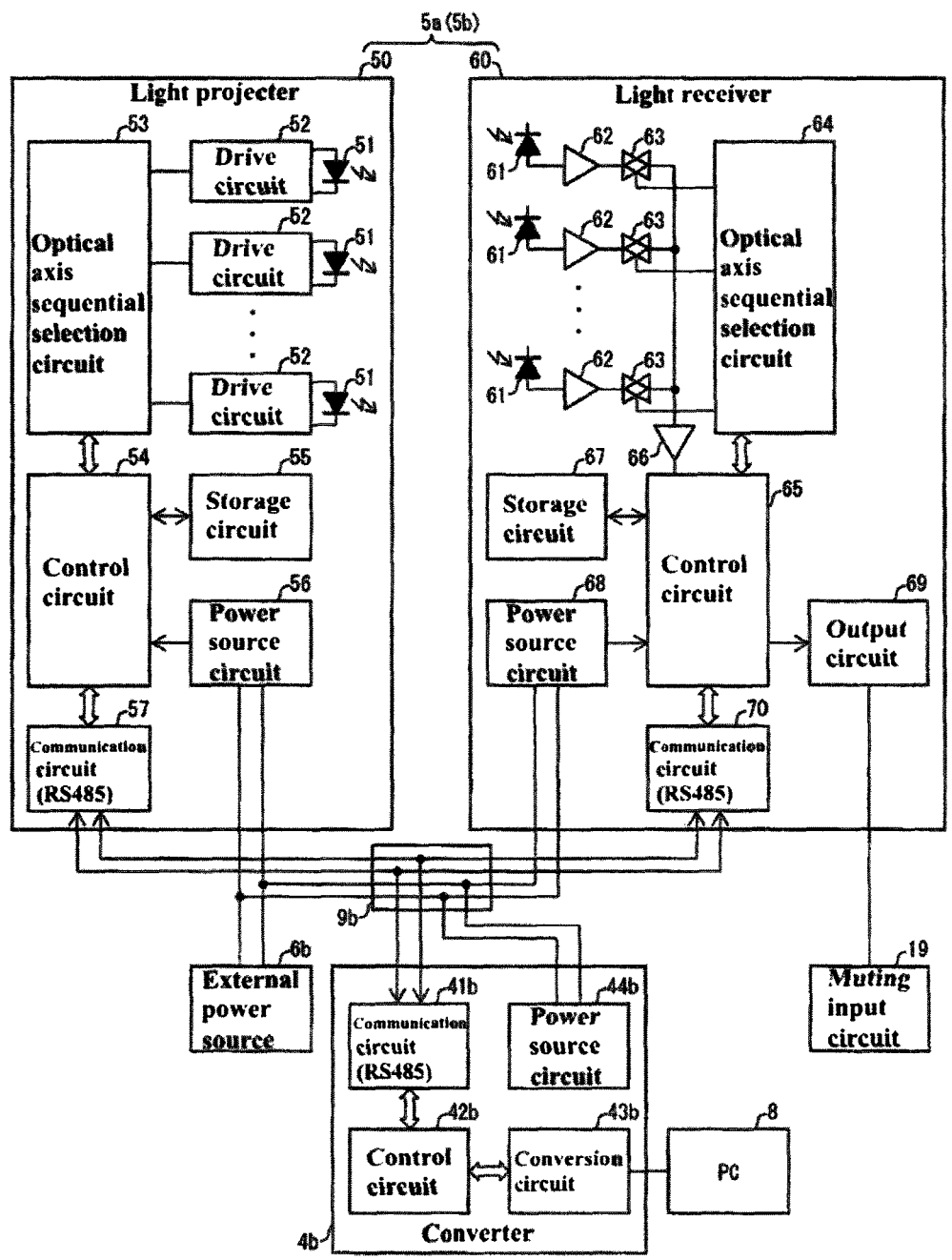
FIG. 5 is a block diagram showing a configuration of a muting sensor included in the hazard sensing system in FIG. 1.

FIG. 5 is a block diagram showing a configuration of the muting sensors 5a and 5b.

Multiple light emitting elements 51 composed of LEDs, drive circuits 52 provided for each light emitting element 51, an optical axis sequential selection circuit 53, a control circuit (sensing determination unit, control unit) 54, a storage circuit 55, a power source circuit 56, a communication circuit 57, and the like are provided in the housing of the light projector 50.

Multiple light receiving elements 61 composed of photo diodes, amplifiers 62 and analog switches 63 provided for each light receiving element 61, an optical axis sequential selection circuit 64, a control circuit (sensing determination unit, control unit) 65, an amplifier 66 provided on the output line from the analog switches 63 to the control circuit 65, a storage circuit 67, a power source circuit 68, an output circuit (muting processing unit) 69, a communication circuit 70, and the like are provided in the housing of the light receiver 60.

The communication circuits 57 and 70 are compliant with the RS485 standard. The power source circuits 56 and 68 each receive a supply of power from a common external power source 6b and generate power for causing the circuits in the housings to operate. The control circuits 54 and 65 are microcomputers that operate at the same timing by communicating with each other via the communication circuits 57 and 70.

The output circuit 69 in the light receiver 60 receives and outputs a later-described sensing determination result from the control circuits 54 and 65. The aforementioned OR circuits 58 and 59 are included, which output the above-described muting inputs A and B to the muting input circuit 19.

The optical axis sequential selection circuits 53 and 64 of the light projector 50 and the light receiver 60 are each gate circuits for enabling the optical axes one-by-one in sequence. The control circuits 54 and 65 of the light projector 50 and the light receiver 60 each emit a timing signal by switching the selection of the optical axis in the optical axis sequential selection circuits 53 and 64 at synchronized timings by communicating with each other. Accordingly, the light emitting elements 51 for the optical axes of the light projector 50 are illuminated in sequence, and in coordination with this, received light amount signals generated in the light receiving elements 61 corresponding to the illuminated light emitting elements 51 are input to the control circuit 25 in the light receiver 60. Note that in the present embodiment, the control circuits 54 and 65 select a portion of the optical axes as the trigger channel (detection optical axis) A1 (A2), and select another portion as the trigger channel (detection optical axis) B1 (B2). The method for selecting the trigger channel will be described later.

The control circuits 54 and 65 determine whether the optical axes are unobstructed or blocked by comparing the received light amount of the optical axes with predetermined threshold values. Furthermore, the control circuits 54 and 65 determine whether or not the trigger channel as a whole is sensed by aggregating the determination result for each optical axis each time all optical axes included in the trigger channel have been selected.

The storage circuits 55 and 67 store programs and various parameters needed for the operation of the control circuits 54 and 65, and the like.

The communication line between the light projector 50 and the light receiver 60, and the power source line between the external power source 6b and the power source circuits 56 and 68 are connected to the converter 4b via a branching connector 9b.

An RS485 communication circuit 41b, a control circuit 42b, a conversion circuit 43b, a power source circuit 44b, and the like are provided in the converter 4b. The communication line and the power source line between the light projector 50 and the light receiver 60 are branched by the branching connector 9b and the branching path of the communication line is connected to the communication circuit 41b of the converter 4b, and the branching path of the power source line is connected to the power source circuit 44b.

The power source circuit 44b receives a supply of power from the external power source 6b via the branched power source line and generates power for causing the circuits in the converter 4b to operate. The conversion circuit 43b has a function of converting RS485 signals handled by the control circuits 54 and 65 of the light projector 50 and the light receiver 60 into RS282C or USB signals, and vice versa. An RS282C or USB port is connected to the PC (personal computer) 8.

The PC 8 is connected when setting operations of the muting sensors 5a and 5b and when a user wishes to check the operation state. If the user performs an operation for a setting relating to an operation of the muting sensors 5a and 5b with respect to the PC 8, the set information is provided to the control circuits 54 and 65 of the light projector 50 and the light receiver 60 via the converter 4b and the communication circuits 57 and 70, and it is registered in the storage circuits 55 and 67. Also, in the PC 8, in the case where an operation for designating the reading-out of information stored in the storage circuits 55 and 67 is performed, a command accompanying the operation is provided to the control circuits 54 and 65 of the light projector 50 and the light receiver 60 using the same route as described above, and information read out from the storage circuits 55 and 67 according to the command by the control circuits 54 and 65 is transferred to the PC 8 by a route that is the reverse of that described above.

1-5. Sensing Operation Performed by the Muting Sensors 5a and 5b

FIGS. 6A to 6F are diagrams for illustrating states in which the optical axes of the muting sensors 5a (a) and the sensing target W are viewed in a direction parallel to the optical axes.

Figure 6A:
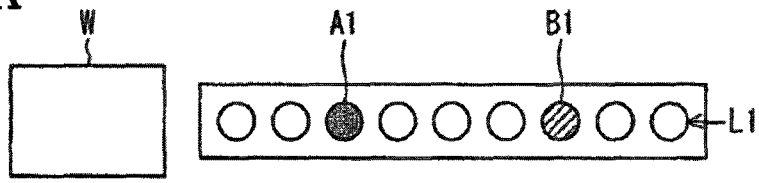
FIGS. 6A to 6F are diagrams for illustrating a method for selecting a trigger channel (sensing optical axis) in the muting sensor in FIG. 5.
Figure 6B:
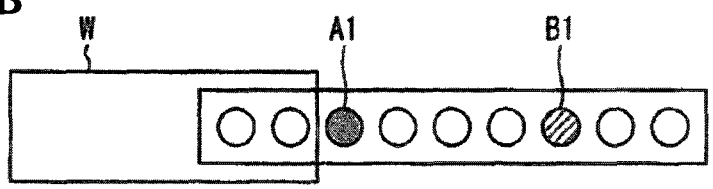
Figure 6C:
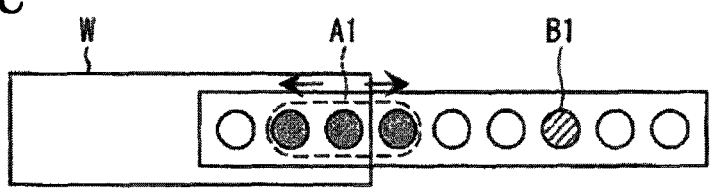
Figure 6D:
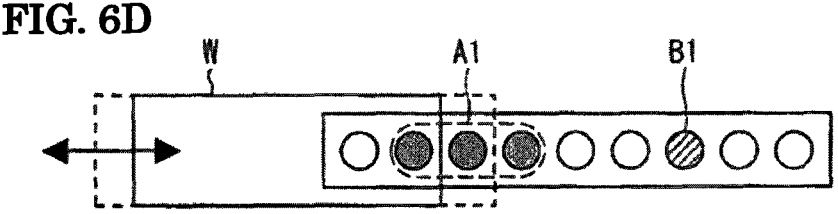

As shown in FIG. 6A, in the present embodiment, in an initial state before the work piece W is conveyed to the sensing range of the muting sensors 5a (a), the control circuits (control units) 54 and 65 perform processing for a first mode in which each selects one optical axis arranged at a location along the movement direction of the sensing target W, and the selected optical axes are used as the trigger channels A1 (A2) and B1 (B2) respectively. At this time, since the trigger channel A1 (A2) is receiving light, the control circuits 54 and 65 determine that it is in a non-sensing state.

Thereafter, after the state shown in FIG. 6 (b), upon the work piece W being conveyed so as to block the trigger channel A1 (A2) as shown in FIG. 6 (c), the control circuits 54 and 65 determine that the trigger channel A1 (A2) is in a sensing state and switch to a second mode in which a total of three optical axes, namely the optical axis selected as the trigger channel A1 (A2) in the initial state (first mode) and the two optical axes neighboring that optical axis, are used as the trigger channel A1 (A2). The output circuit 69 receives the sensing determination of the trigger channel A1 (A2) from the control circuits 54 and 65 and performs output for the trigger channel A1 (A2). Accordingly, even in the case where the work piece W vibrates as shown in FIG. 6D, the case where an opening portion is present in the work piece W, or the like, it is possible to more stably detect the work piece W using the trigger channel A1 (A2) and it is possible to maintain the sensing state. In the second mode, while one optical axis of the trigger channel A1 (A2) composed of the aforementioned three optical axes is blocked, the control circuits 54 and 65 determine that it is in a sensing state, and when all of the optical axes stop being blocked, they determine that it is in a non-sensing state.

Note that if the one optical axis selected as the trigger channel A1 (A2) in the initial state (first mode) is not blocked, the control circuits 54 and 65 will keep the trigger channel A1 (A2) in the initial state and monitor it for blocking. Also, after the trigger channel A1 (A2) is switched to the second mode, and until all of the optical axes included in the trigger channel A1 (A2) stop being blocked (until all of the optical axes included in the trigger channel A1 (A2) enter the light receiving state), the control circuits 54 and 65 keep the trigger channel A1 (A2) in the second mode. At this time, the trigger channel B1 (B2) is in a non-sensing state.

Figure 6E:
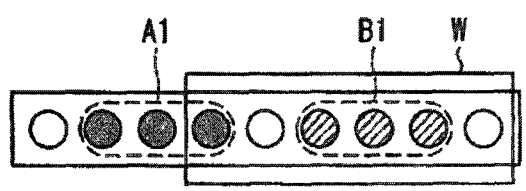

Thereafter, as shown in FIG. 6E, upon the work piece W being further conveyed so as to block the trigger channel B1 (B2), the control circuits 54 and 65 determine that the trigger channel B1 (B2) is in the sensing state and switch to the second mode, in which a total of three optical axes, namely the optical axis selected as the trigger channel B1 (B2) in the initial state (first mode) and the two optical axes neighboring that optical axis, are used as the trigger channel B1 (B2). The output circuit 69 receives the sensing determination of the trigger channel B1 (B2) from the control circuits 54 and 65 and performs output for the trigger channel B1 (B2). Note that if the optical axis selected as the trigger channel B1 (B2) in the initial state (first mode) is not blocked, the control circuits 54 and 65 will keep the trigger channel B1 (B2) in the initial state and monitor it for blocking. Also, after the trigger channel B1 (B2) is switched to the second mode, and until the trigger channel B1 (B2) stops being blocked (until the trigger channel B1 (B2) enters the light receiving state), the control circuits 54 and 65 keep the trigger channel B1 (B2) in the second mode.

Figure 6F:
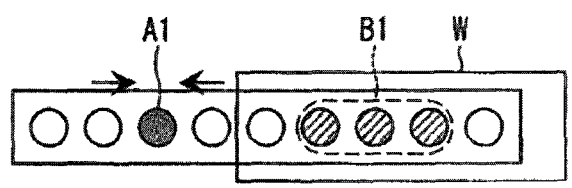

Thereafter, as shown in FIG. 6F, upon the work piece W being further conveyed so that all of the optical axes included in the trigger channel A1 (A2) are no longer blocked, the control circuits 54 and 65 determine that the trigger channel A1 (A2) is in a non-sensing state and return the optical axis selected as the trigger channel A1 (A2) to the initial state (first mode). Also, upon the work piece W being further conveyed so that the trigger channel B1 (B2) is no longer blocked, the control circuits 54 and 65 return the optical axis selected as the trigger channel B1 (B2) to the initial state (first mode). The output circuit 69 receives the non-sensing determination of the trigger channel A1 (A2) from the control circuits 54 and 65 and stops output for the trigger channel A1 (A2).

Furthermore, the operation of the trigger channel B1 (B2) when the work piece W is conveyed is similar to that of the trigger channel A1 (A2).

Thus, in the present embodiment, it is possible to set multiple sensing optical axes (trigger channels A1 and B1 (A2 and B2)) of the first mode at mutually different positions in the muting sensor 5a (5b), and in the second mode, it is possible to set multiple sensing optical axes of the second mode, which are obtained by adding optical axes other than the sensing optical axes of the first mode to the plurality of sensing optical axes of the first mode. Also, switching between the first mode and the second mode can be performed for each trigger channel.

1-6. Advantages of Hazard Sensing System S

Figure 7A:
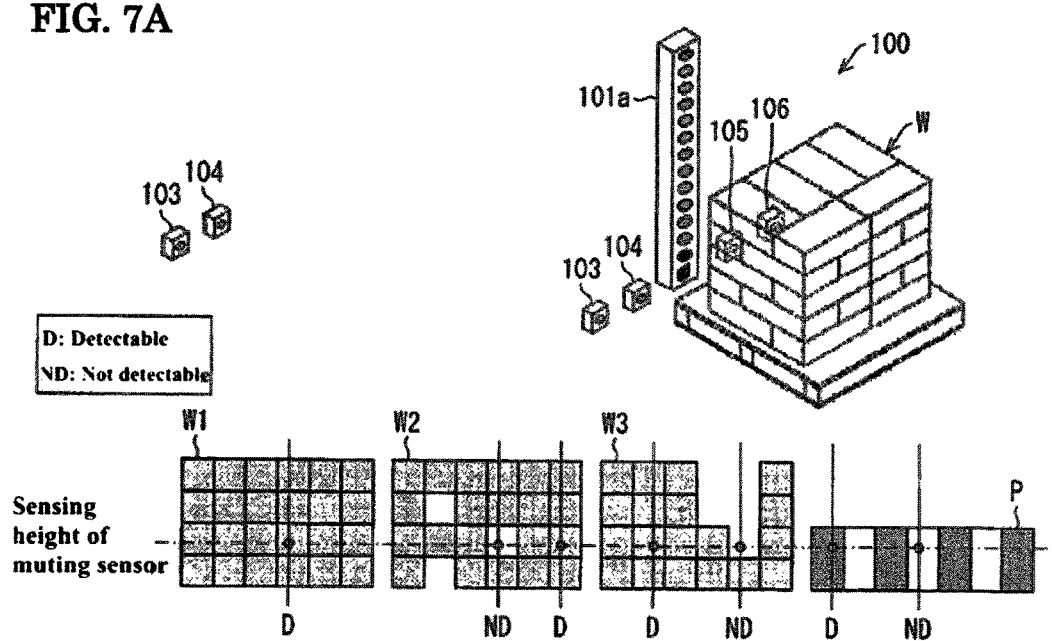
FIG. 7A is a diagram for illustrating a state in which a work piece is sensed by a conventional hazard sensing system.
Figure 7B:
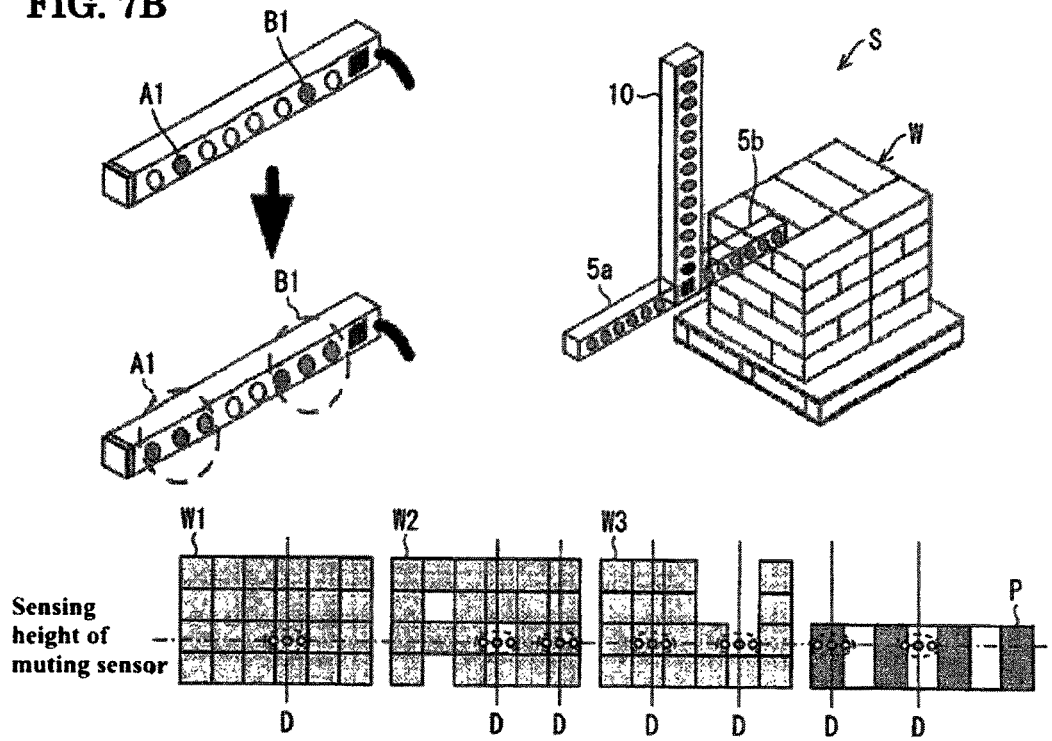
FIG. 7B is a diagram for illustrating a state in which a work piece is sensed by the hazard sensing system shown in FIG. 1.
Figure 18:
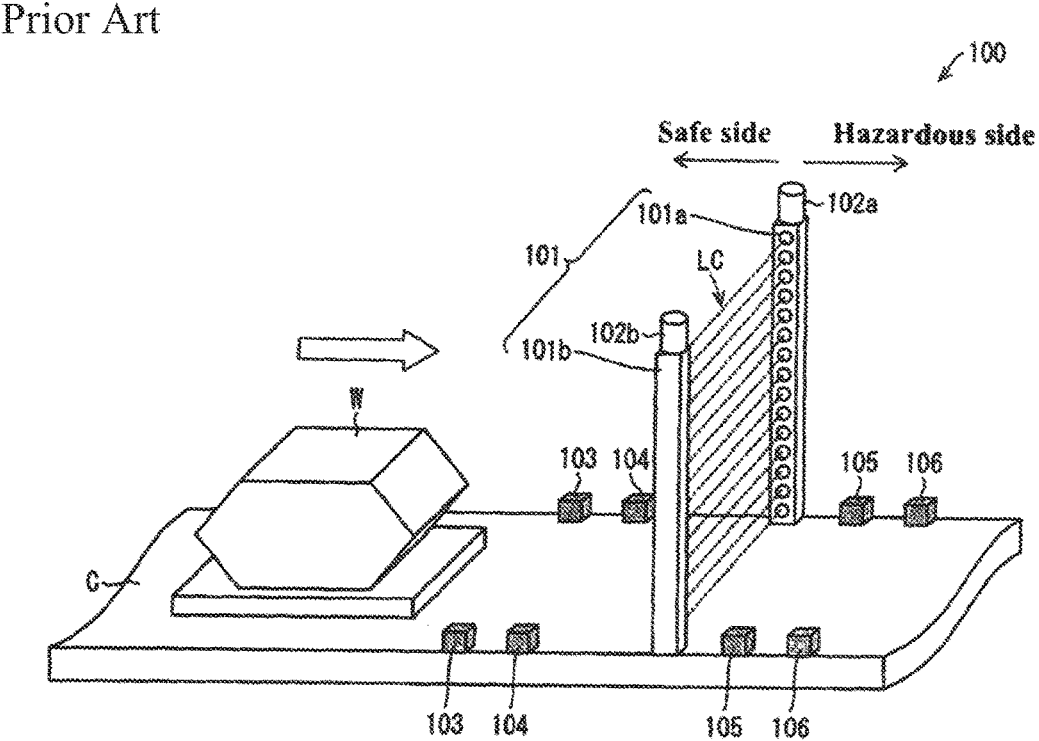
FIG. 18 is a diagram for illustrating a conventional hazard sensing system.

FIG. 7A is a diagram for illustrating a state in which a work piece is being sensed by the conventional sensor apparatus 100 shown in FIG. 18, and FIG. 7B is a diagram for illustrating a state in which a work piece is being sensed by the hazard sensing system S according to the present embodiment.

As shown in FIG. 7A, single-optical-axis sensors are used as the muting sensors 103 to 106 in the conventional sensor apparatus 100. For this reason, a work piece can be appropriately detected by the sensor apparatus 100 in the case of a work piece having a simple shape with no holes, cut-out portions, or the like, such as a work piece W1, but in cases where, for example, a hole is located at a position corresponding to the detection height of the muting sensor as with a work piece W2, a cut-out portion is present at a position corresponding to the sensing height of the muting sensor as with a work piece W3, a concave portion is present at a position corresponding to the sensing height of the muting sensor as with the pallet P, or the like, these sites are not detectable (ND) and cannot be appropriately sensed in some cases.

In contrast, with the hazard sensing system S according to the present embodiment, as shown in FIG. 7B, one optical axis is selected as a trigger channel in an initial state, and when a work piece W is sensed by the trigger channel, the number of optical axes used as the trigger channel is increased (the sensing optical axis of the trigger channel is expanded). Accordingly, even if the shape of the work piece (or pallet) is complex, the work piece (or pallet) can be appropriately sensed.

Figure 8A:
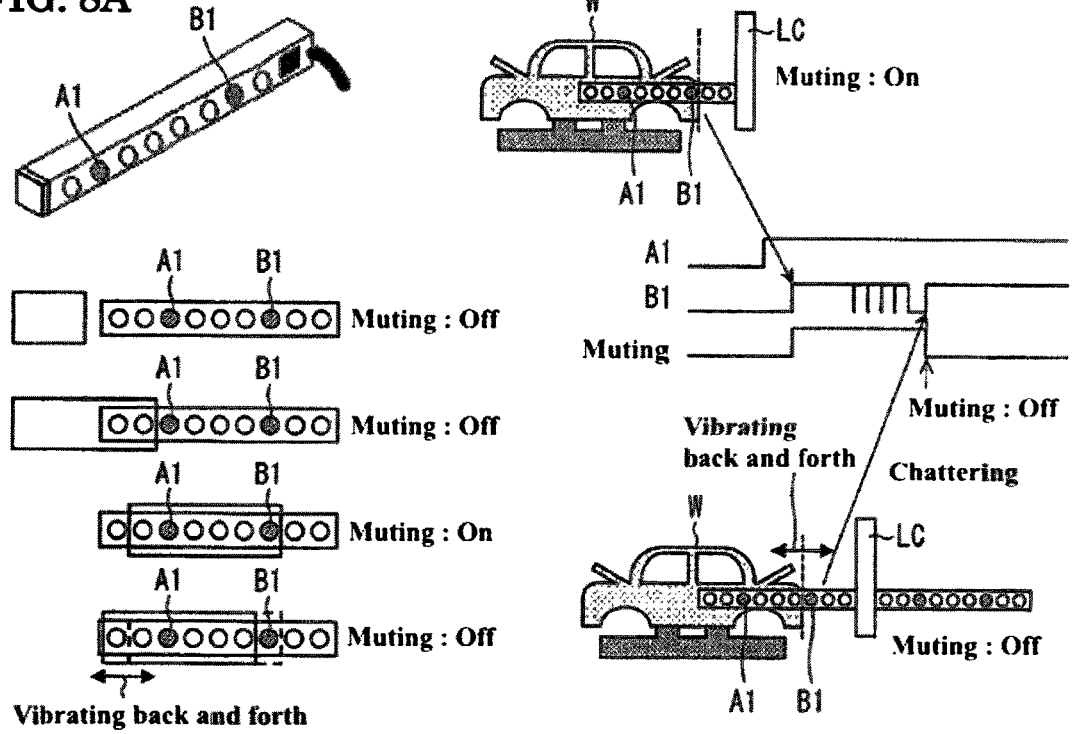
FIGS. 8A and 8B are diagrams for illustrating sensing results in the case where a work piece vibrates back and forth in the conveyance direction, FIG. 8A showing a comparative example in which the trigger channel is fixed as one optical axis, and FIG. 8B showing an embodiment in which the number of optical axes in the trigger channel is expanded.
Figure 8B:
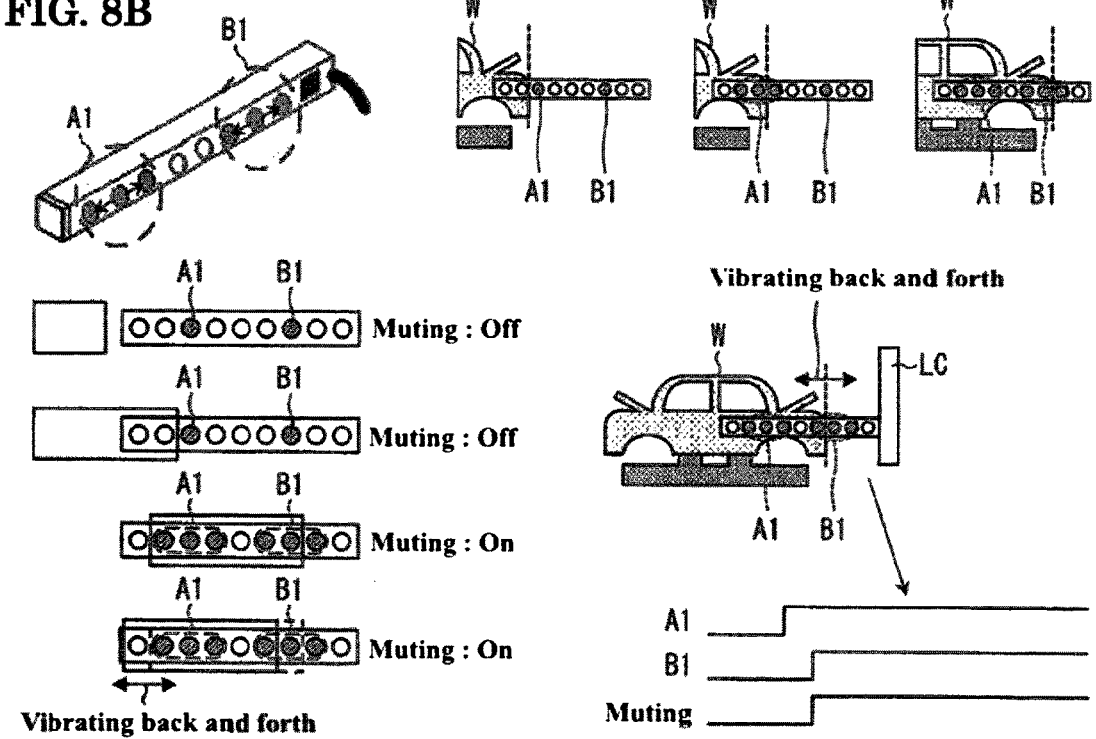

Also, FIGS. 8A and 8B are diagrams for illustrating a sensing result in the case where the work piece vibrates back and forth in the conveyance direction, FIG. 8A showing a comparative example in which the trigger channel is fixed as one optical axis, and FIG. 8B showing a hazard sensing system S according to the present embodiment (an embodiment in which the number of optical axes (sensing area) of the trigger channel is expanded).

In the comparative example of FIG. 8A, if the work piece W vibrates back and forth in the conveyance direction, chattering occurs in the output signal of the trigger channel, and the muting function is switched off even when the work piece W is being conveyed normally (even when the aforementioned vibration is within an allowable range) in some cases.

In contrast to this, according to the present embodiment, as shown in FIG. 8B, by expanding the sensing optical axis of the trigger channels A1 and B1 to be a range that is wider than the vibration width of the work piece W, the work piece W can be appropriately sensed even if vibration of the work piece W occurs, and it is thus possible to prevent the muting function from being inappropriately switched off.

Also, even in the case where it is used as a muting application that has become more advanced in recent years, as described above, it is possible to supply a stable muting trigger signal easily, without requiring complex settings, or the like. Accordingly, since the user will be able to use the muting function more stably, it is possible to achieve an improvement in productivity and maintain productivity at the production site.

1-7. Modified Example of Trigger Channel Selection Method

The present embodiment has described a configuration in which only one optical axis is selected for each trigger channel in the initial state (first mode), and when a work piece W is sensed by the trigger channel, the number of optical axes selected as the trigger channel is increased to three, and thereby a switch to the second mode is performed. However, the present invention is not limited to this. Also, there is no particular limitation to the number of optical axes included in the muting sensors 5a and 5b. Also, there is no particular limitation to the position of the trigger channels and the number of installed trigger channels.

Figure 9:
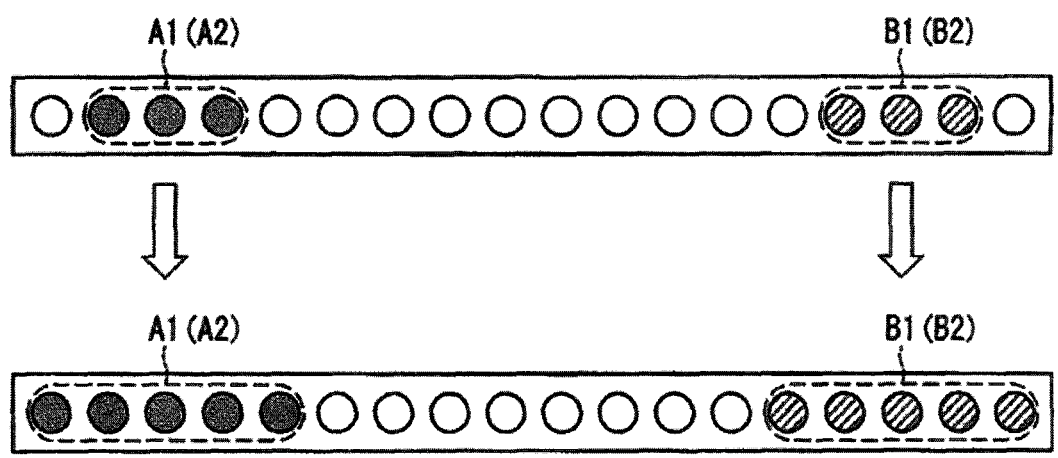
FIG. 9 is a diagram for illustrating a modified example of a method for setting trigger channels in the hazard sensing system shown in FIG. 1.

For example, as shown in FIG. 9, it is possible to use three optical axes as the optical axes selected for each trigger channel in the initial state (first mode), increase the number of optical axes selected as the trigger channels to five when a work piece W is sensed by the trigger channel (when the optical axes belonging to the trigger channel are blocked, or when a predetermined number of the optical axes belonging to the trigger channel are blocked), and thereby perform a switch to the second mode.

Note that the method of setting the optical axis to be used as the trigger channel by the user is not particularly limited, and for example, it is possible to perform the method using an input unit (not shown) such as a dip switch included in the hazard sensing system S, and it is possible to perform the method via another device (e.g., the PC 8) that is communicably connected to the hazard sensing system S.

1-8. Modified Example 1 of the Muting Sensors

The present embodiment has described a configuration of using a light projector 50 and a light receiver 60 configured such that light emitting elements 51 and light receiving elements 61 are arranged linearly along a horizontal direction. However, the present invention is not limited to this.

Figure 10A:
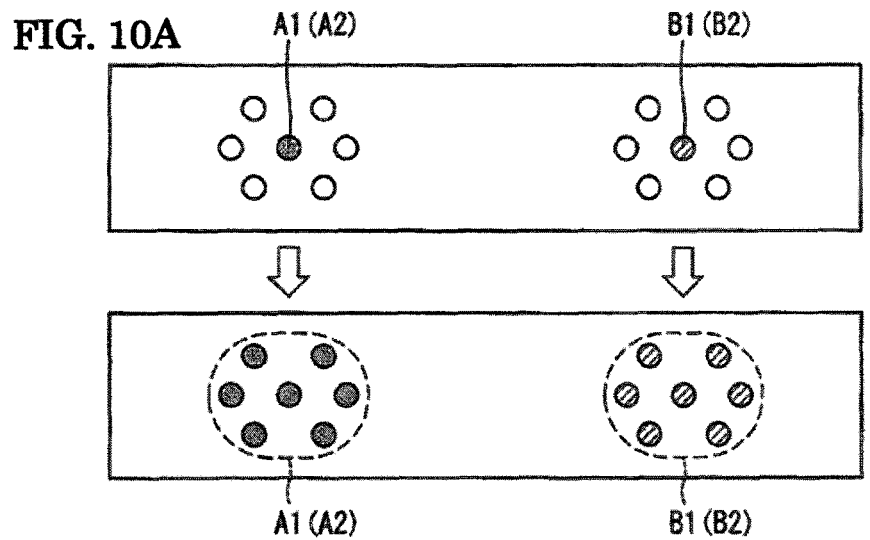
FIGS. 10A to 10C are diagrams for illustrating modified examples of the muting sensor included in the hazard sensing system shown in FIG. 1.
Figure 10B:
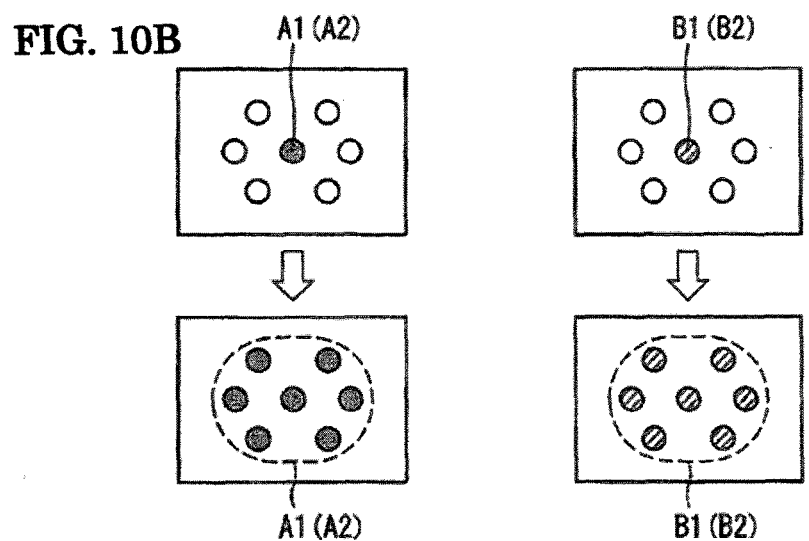
Figure 10C:
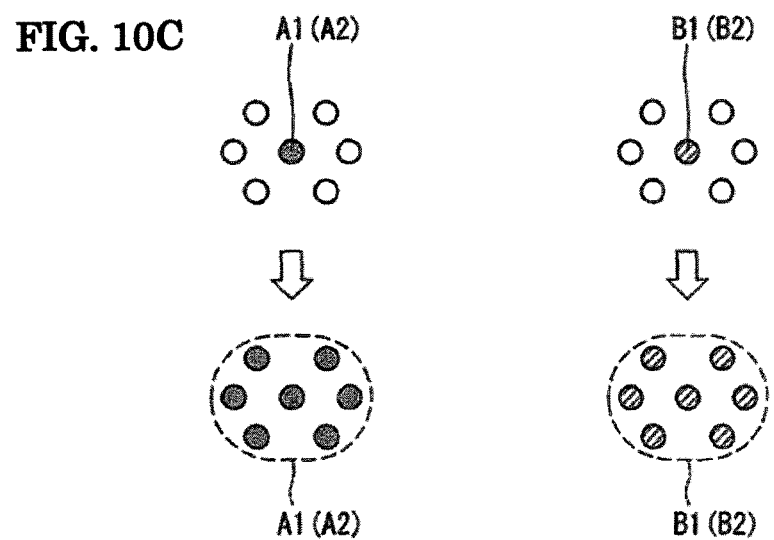

FIGS. 10A to 10C are each diagrams for describing a modified example of the muting sensor 5a (5b), which show a state in which the optical axes included in the muting sensor 5a (5b) are viewed in a direction orthogonal to the conveyance direction of the work piece W. Also, the optical axes with hatching in the drawings indicate trigger channels A1 (B1) and A2 (B2), and the white optical axes indicate optical axes that have not been selected as a trigger channel.

As shown in FIG. 10A, it is possible to arrange multiple optical axes around the optical axis selected as the trigger channel in the initial state (first mode), select multiple optical axes including the optical axis and the surrounding optical axes as the trigger channel when a work piece W is sensed by the optical axis selected as the trigger channel in the initial state, and thereby switch to the second mode. Also, as shown in FIG. 10B, the optical axes used as the trigger channel A1 (A2) and the optical axes used as the trigger channel B1 (B2) may be formed in respective separate housings. Also, as shown in FIG. 10C, the respective optical axes may be arranged independently.

1-9. Modified Example 2 of the Muting Sensors

The present embodiment has described a configuration in which, with respect to the hazard sensing sensor 1, the muting sensor 5a is provided upstream in the conveyance direction of the work piece W and the muting sensor a is provided downstream, but the present invention is not limited thereto.

Figure 11:
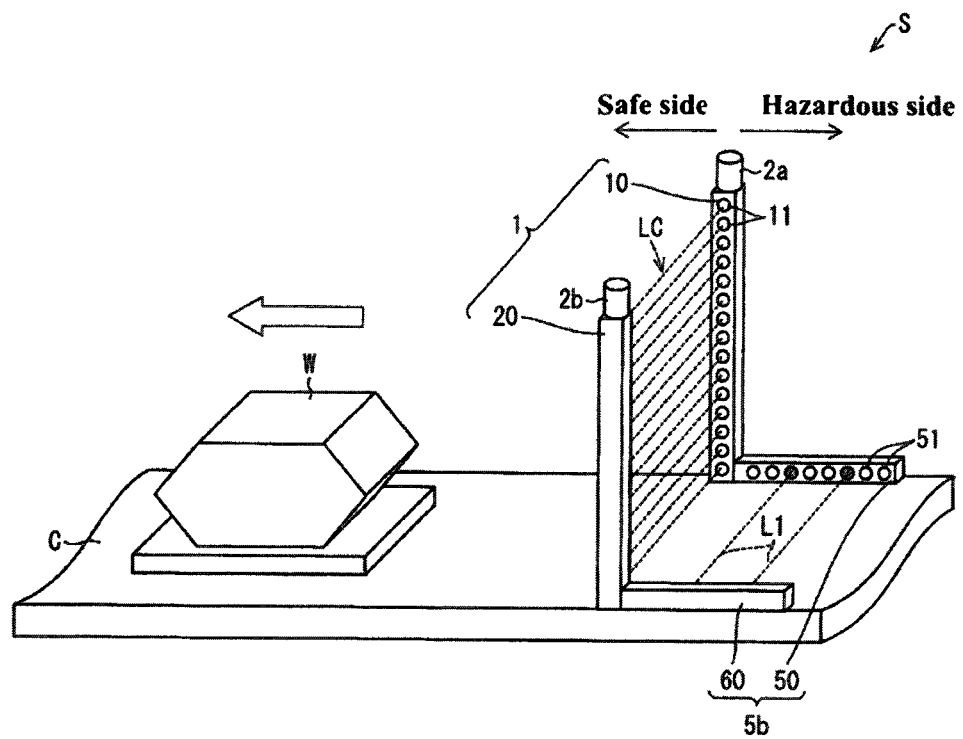
FIG. 11 is a diagram for illustrating a modified example of a muting sensor included in the hazard sensing system shown in FIG. 1.

For example, if the hazard sensing system S is installed in the exit portion of the hazardous area, as shown in FIG. 11, it is possible to not include one of the muting sensors 5a and a (for example, the muting sensor located downstream of the hazard sensing sensor 1 (on the safe side) in the conveyance direction of the work piece W).

1-10. Modified Example 3 of the Muting Sensors

The present embodiment has described a configuration in which the muting sensors 5a and 5b are provided separately, but the present invention is not limited thereto.

Figure 19:
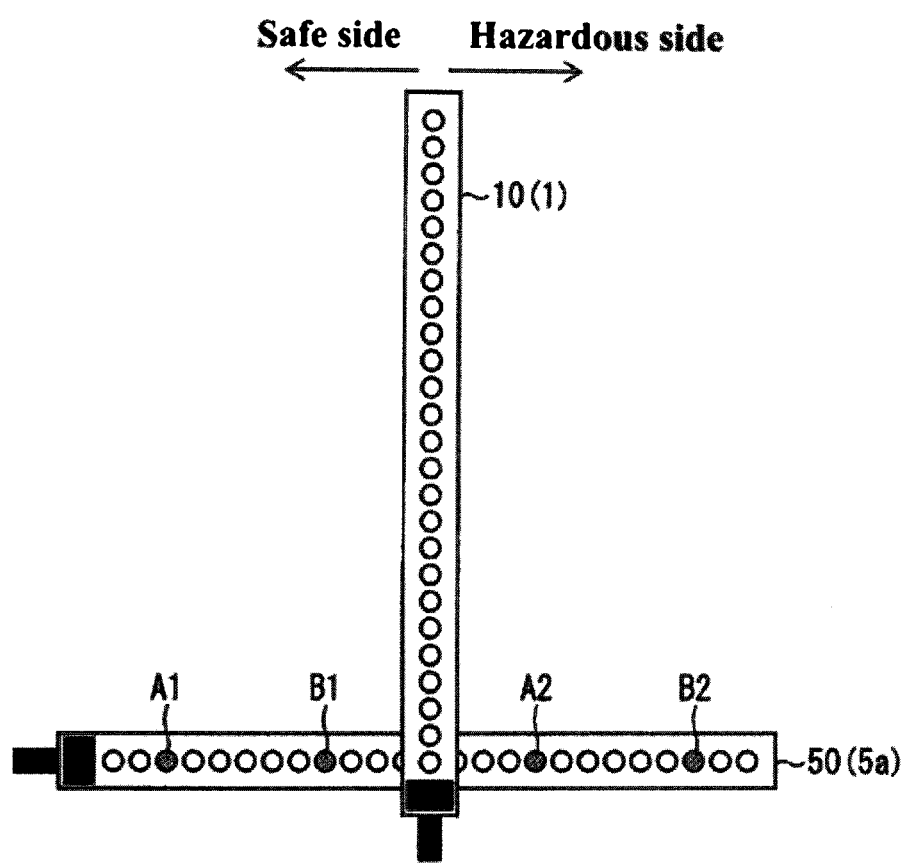
FIG. 19 is a diagram for illustrating a modified example of a muting sensor included in the hazard sensing system shown in FIG. 1.

For example, as shown in FIG. 19, it is possible to omit the muting sensor 5b and arrange the muting sensor 5a such that it extends to a region on the upstream side (on the safe side) in the conveyance direction of the work piece W and to a region on the downstream side (on the hazardous side) with respect to the hazard sensing sensor 1, and thereby realize the functions of the trigger channels A1, B1, A2, and B2 using the muting sensor 5a. Accordingly, the number of man-hours for wiring can be reduced compared to the case of providing both muting sensors 5a and 5b.

1-11. Modified Example 4 of the Muting Sensors

In the present embodiment, a multi-optical-axis photoelectric sensor is used in which multiple integrated optical axes are arranged linearly as the muting sensors 5a and 5b, but the present invention is not limited thereto. For example, the muting sensors 5a and a may be constituted by arranging many single-optical-axis photoelectric sensors, using a portion thereof as trigger channels in an initial state, and using the other single-optical-axis photoelectric sensors according to the state of sensing the work piece W to expand the trigger channel. Also, the muting sensors 5a and a may be constituted by a combination of a single-optical-axis photoelectric sensor and a multi-optical-axis photoelectric sensor.

Embodiment 2

Another embodiment of the present invention will be described below. Note that for the sake of convenience in the description, members having the same functions as those of Embodiment 1 will be denoted by the same reference numerals and description thereof will not be repeated.

Embodiment 1 described a configuration in which, as muting sensors 5a and 5b, a light projector 50 including multiple light emitting elements 51 and a light receiver 60 including multiple light receiving elements 61 that correspond to the light emitting elements 51 are arranged such that the light emitting elements 51 and the light receiving elements 61 are aligned in the horizontal direction (the movement direction of the work piece W).

Figure 12:
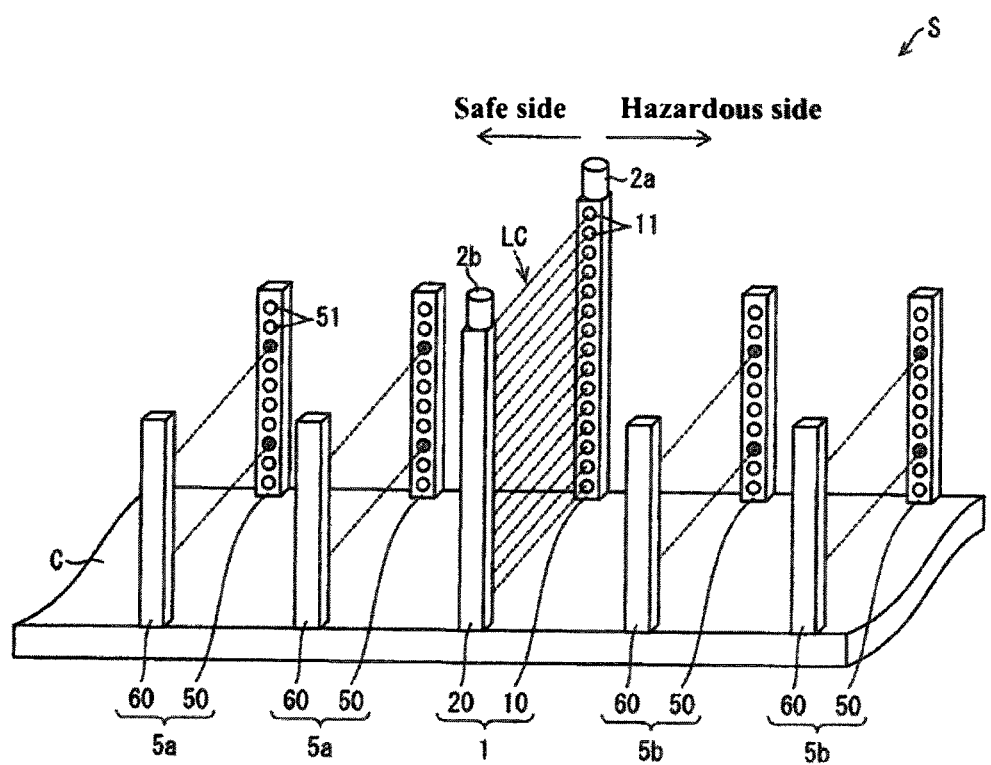
FIG. 12 is a diagram for illustrating an example of installation of a hazard sensing system according to another embodiment of the present invention.

In contrast to this, in the present embodiment, as shown in FIG. 12, multiple muting sensors 5a and a are arranged such that they are connected in a straight line and the light emitting elements 51 and the light receiving elements 61 are aligned in the vertical direction (direction intersecting the movement direction of the work piece W, and a portion of the optical axes of the muting sensors 5a and a are used as trigger channels (sensing optical axes). Note that the optical axes denoted with hatching in FIG. 12 indicate optical axes selected as trigger channels, and the white optical axes indicate optical axes that have not been selected as trigger channels.

Figure 13:
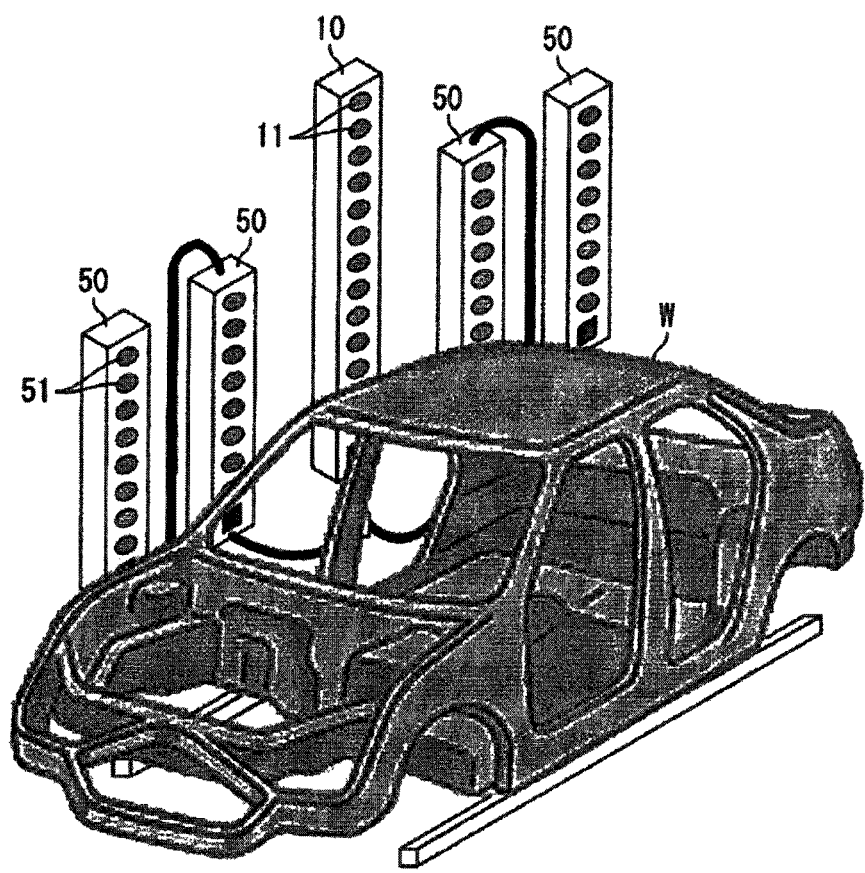
FIG. 13 is a diagram for illustrating an example of a state in which a work piece is sensed by the hazard sensing system shown in FIG. 12.
Figure 15A:
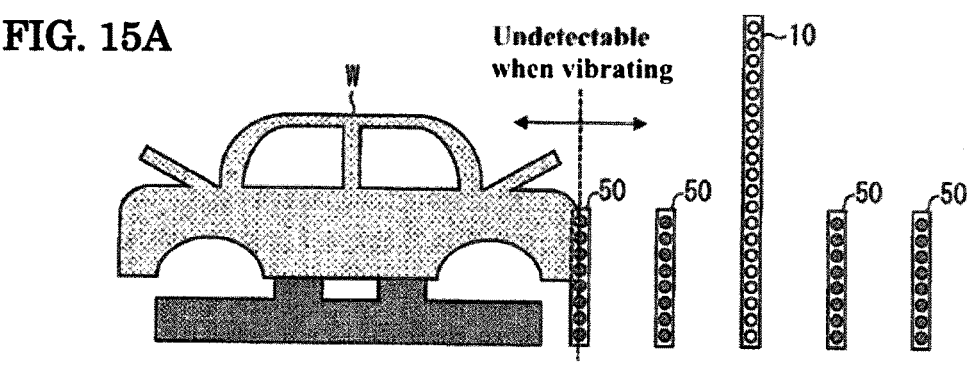
FIGS. 15A to 15C are diagrams for illustrating a state in which a work piece is sensed by the hazard sensing system shown in FIGS. 12 and 14.

Accordingly, as shown in FIG. 13 and FIG. 15A, even in the case where a work piece W is large and has a complex shape, such as with an automobile chassis, it is possible to appropriately sense the work piece W.

Figure 14:
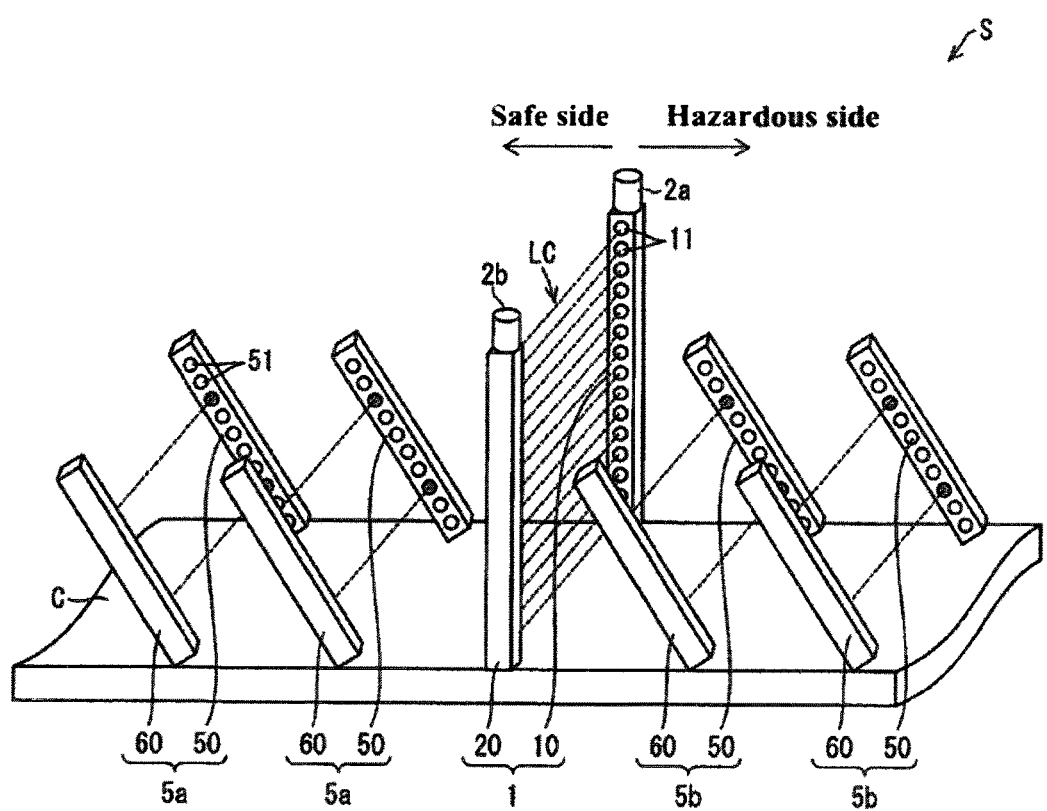
FIG. 14 is a diagram for illustrating a modified example of the hazard sensing system shown in FIG. 12.
Figure 15B:
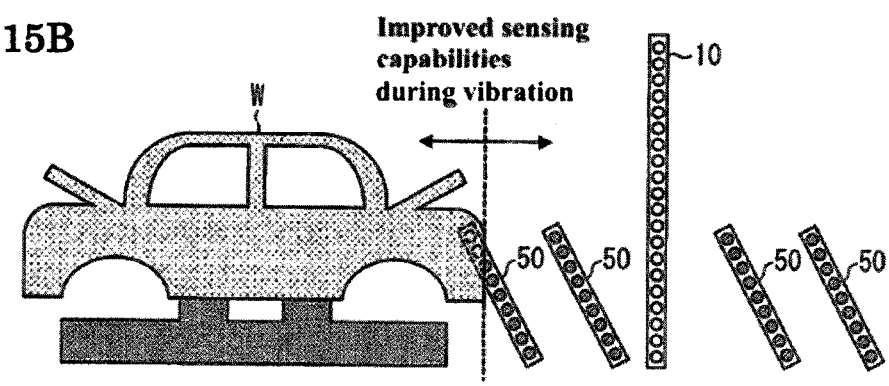

Note that as shown in FIG. 14 and FIG. 15B, it is possible to arrange the muting sensors 5a and a such that they are connected in a line and the light emitting elements 51 and the light receiving elements 61 are aligned in a direction that is inclined with respect to the vertical direction (direction that intersects the movement direction of the work piece W. An angle greater than 0 degrees and less than 90 degrees with respect to the movement direction of the sensing target), and the muting sensors 5a and 5b themselves are used as one trigger channel.

Figure 20A:
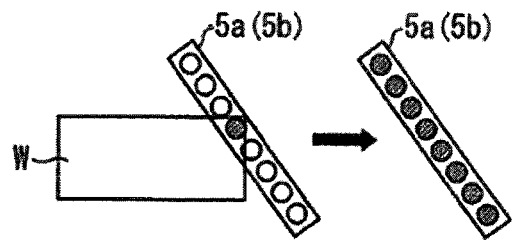
FIGS. 20A to 20E are diagrams for illustrating an example of a method for switching sensing modes of muting sensors.

Also, in such a case, as shown in FIG. 20A, in the initial state (first mode), one of the optical axes included in the muting sensors 5a and 5b (predetermined optical axis) may be used as a trigger channel, and a switch to the second mode may be performed by adding the optical axes surrounding that optical axis (or all of the optical axes) to the trigger channel when the optical axis functioning as the trigger channel is blocked in the initial state.

Figure 20B:
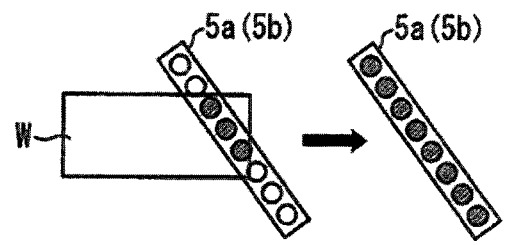

Alternatively, as shown in FIG. 20B, in the initial state (first mode), a predetermined number (a whole number greater than or equal to 2) of the optical axes included in the muting sensors 5a and a (a predetermined peripheral optical axis) may be used as the trigger channel, and a switch to the second mode may be performed by adding the optical axes peripheral to those optical axes (or all of the optical axes) to the trigger channel when all of the optical axes selected as the trigger channel in the initial state are blocked.

Figure 20C:
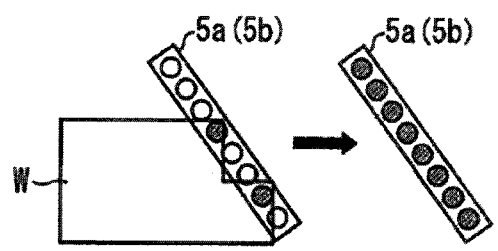

Also, as shown in FIG. 20C, a portion (predetermined optical axes) of the optical axes included in the muting sensors 5a and a in the initial state (first mode) may be used as the trigger channel, and a switch to the second mode may be performed by adding the optical axes peripheral to that optical axis (or all optical axes) to the trigger channel when at least a predetermined number of the optical axes set as the trigger channel in the initial state are blocked at the same time.

Accordingly, similarly to the configuration of FIG. 13, it is possible to appropriately sense the work piece W, even if the work piece W is large and has a complex shape, as with an automobile chassis. Also, it is possible to improve the sensing capability for the work piece W in the case where the work piece W vibrates back and forth in the conveyance direction.

Figure 15C:
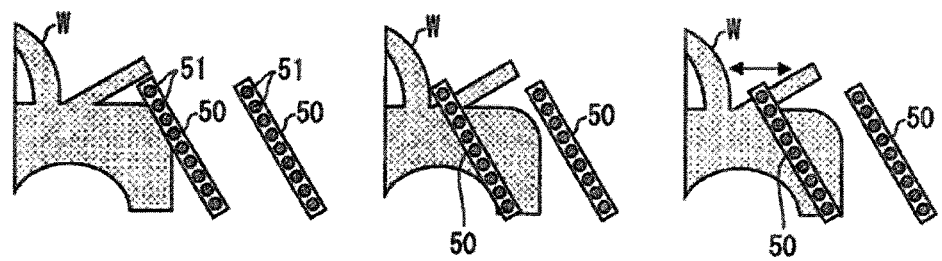

Also, as shown in FIG. 15C, the control circuits 54 and 65 may cause optical axes to be formed between all of the light emitting elements and light receiving elements of the muting sensors 5a and 5b, perform processing for a low-resolution mode in which it is determined that a sensing target has been detected when a predetermined number of optical axes (e.g., 3) included in a predetermined sensing optical axis are blocked at the same time in the initial state, and when it is determined that the sensing target has been sensed in the initial state, switch to processing for a high-resolution mode in which sensing of the above sensing target is performed using each of the optical axes included in the above sensing optical axis.

Figure 20D:
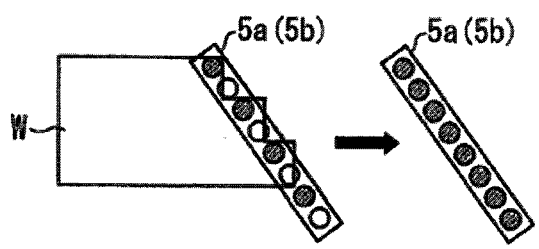

Also, as shown in FIG. 20D, it may be determined that the sensing target has been sensed when, in the low-resolution mode (initial state), a predetermined number of continuous optical axes (trigger channels) are blocked at the same time.

Figure 20E:
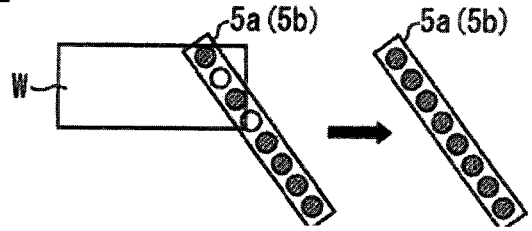

Also, as shown in FIG. 20E, the control circuits 54 and 65 may use optical axes in a predetermined range in the muting sensors 5a and a in the low-resolution mode (partial low-resolution mode) to sense the sensing target when a predetermined number of continuous optical axes (trigger channels) within the predetermined range are blocked at the same time in the low-resolution mode, thereby switching the predetermined range to the high-resolution mode.

Also, in the above-described configurations using the low-resolution mode and the high-resolution mode, it is possible to, after starting processing for the high-resolution mode, return to the low-resolution mode when all of the optical axes in the sensing optical axis are in a light receiving state (a state in which light is no longer blocked).

As shown in these examples, by alternating between use of the low-resolution mode and the high-resolution mode, it is possible to more stably sense the work piece W and appropriately sense the work piece W even if the work piece W vibrates in the conveyance direction.

Embodiment 3

Yet another embodiment of the present invention will be described below. Note that for the sake of convenience in the description, members having the same functions as those in the above-described embodiments will be denoted by the same reference numerals and description thereof will not be repeated.

In the above-described embodiments, a case was described in which the conveyance direction of the work piece W with respect to the muting sensors 5a and 5b is constant. In contrast to this, in the present embodiment, the muting sensors 5a and 5b automatically determine the conveyance direction of the work piece W.

Figure 16A:
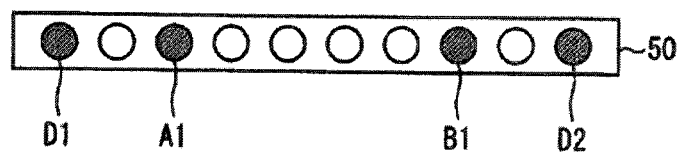
FIGS. 16A to 16D are diagrams for illustrating an example of a method for using an optical axis for automatically determining a conveyance direction of the work piece in a hazard sensing system according to yet another embodiment of the present invention.

FIGS. 16A to 16D are diagrams for illustrating an example of a method of using the optical axes to realize a function of automatically determining the conveyance direction of a work piece in the muting sensors 5a and 5b. As shown in FIG. 16A, in the present embodiment, a first optical axis D1, which is an optical axis on one end of the muting sensors 5a and 5b, and a last optical axis D2, which is an optical axis on the other end, are used as direction determining optical axes.

Figure 17:
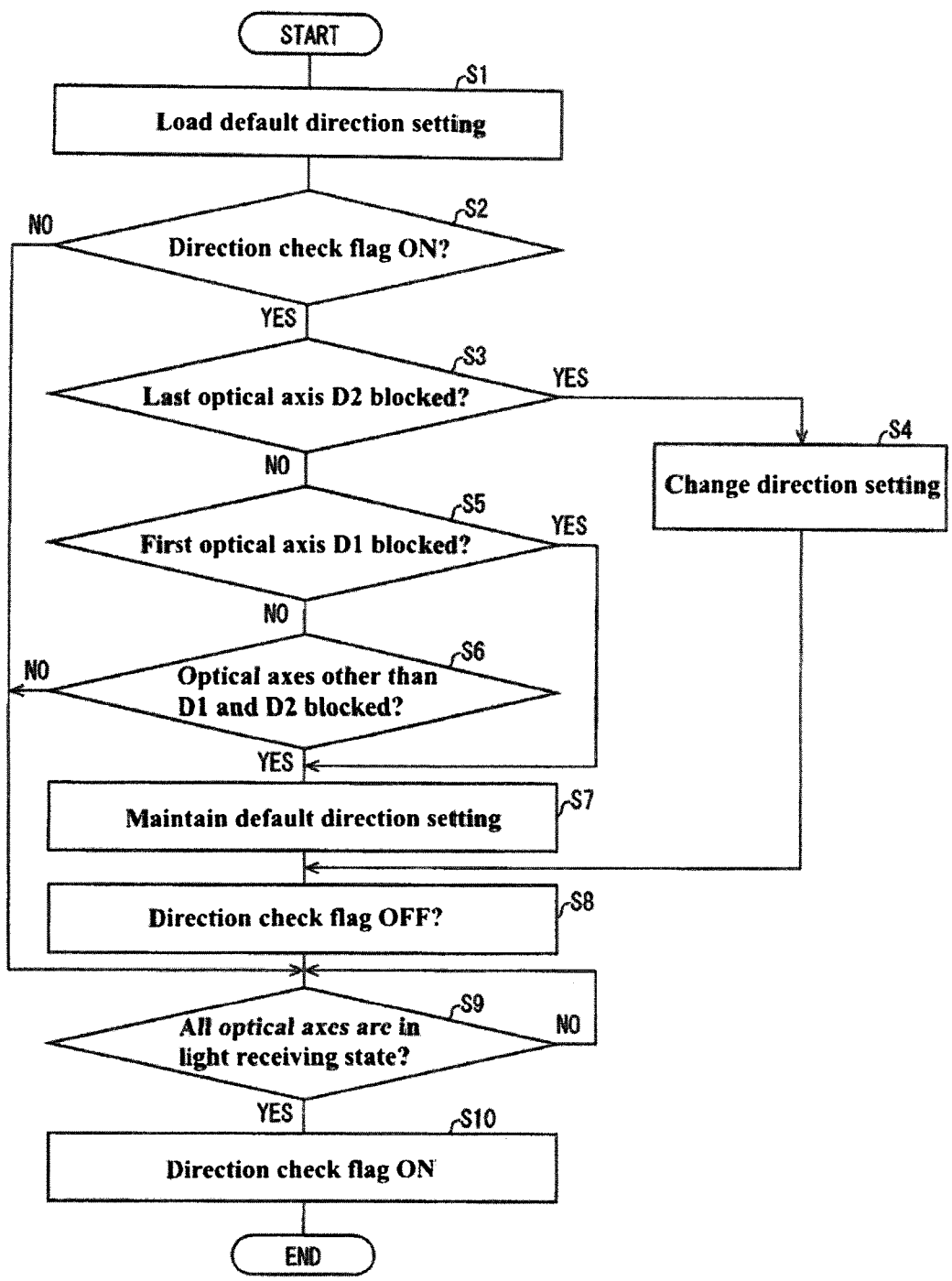
FIG. 17 is a flowchart showing a flow of processing for automatically determining a conveyance direction of a work piece.

FIG. 17 is a flowchart showing a flow of processing for automatically determining the conveyance direction of the work piece. Processing for automatically determining the conveyance direction will be described with reference to this figure.

First, the control circuits 54 and 65 load the default direction settings from the storage circuits 55 and 67 (step S1). In the present embodiment, as shown in FIG. 16A, with the default direction settings, the third optical axis from one end is set as the trigger channel A1 (A2), and the third optical axis from the other end is set as the trigger channel B1 (B2).

Next, the control circuits 54 and 65 determine whether or not the direction check flags stored in the storage circuits 55 and 67 are ON (step S2). Note that the direction check flags are set to be on in the default state.

If it is determined in step S2 that the direction check flag is on, the control circuits 54 and 65 determine whether or not the last optical axis D2 has been blocked (step S3).

Figure 16B:
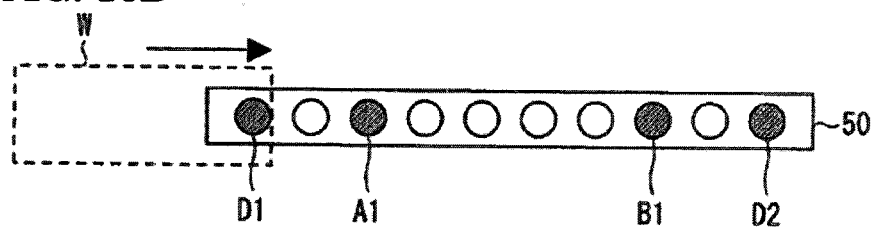
Figure 16C:
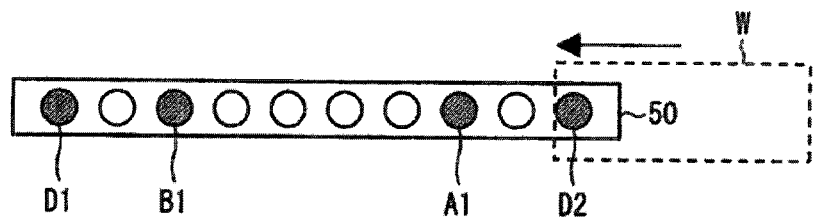

If it is determined in step S3 that the last optical axis D2 has been blocked, the control circuits 54 and 65 determine that the conveyance direction of the work piece is the direction from the other end to the one end, and as shown in FIG. 16C, the third optical axis from the other end is used as the trigger channel A1 (A2), the direction setting is changed so that the third optical axis from the one end is used as the trigger channel B1 (B2) (step S4), and the procedure moves to the processing of step S8.

If it is determined in step S3 that the last optical axis D2 has not been blocked, the control circuits 54 and 65 determine whether or not the first optical axis D1 has been blocked (step S5).

If it is determined in step S5 that the first optical axis D1 has been blocked, the control circuits 54 and 65 determine that the conveyance direction of the work piece is the direction moving from the one end to the other end, and as shown in FIG. 16B, the default direction settings are kept (step S7), and the procedure moves to the processing of step S8.

If it is determined in step S5 that the first optical axis D1 has not been blocked, the control circuits 54 and 65 determine whether or not an optical axis other than the first optical axis D1 and the last optical axis D2 has been blocked.

Figure 16D:
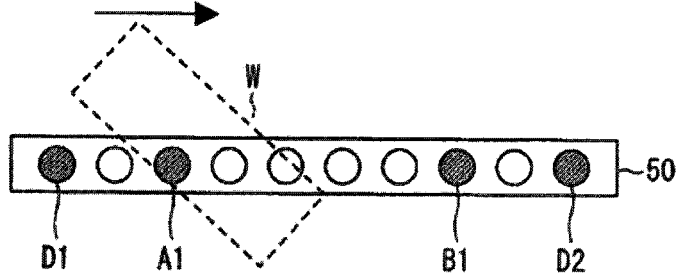

If it is determined in step S6 that an optical axis other than the first optical axis D1 and the last optical axis D2 has been blocked, the control circuits 54 and 65 maintain the default direction settings as shown in FIG. 16D (step S7) and move to the processing of step S8.

In the processing of step S8, the control circuits 54 and 65 switch the direction check flags stored in the storage circuits 55 and 67 to OFF (step S8).

If it is determined in step S2 that the direction check flag is off, if it is determined in step S6 that no optical axis other than D1 and D2 has been blocked (no optical axis has been blocked), and after the direction check flag is set to off in step S8, the control circuits 54 and 65 determine whether or not all of the optical axes are in the light receiving state (in a state of not being blocked) (step S9).

If it is determined in step S9 that all of the optical axes are not in the light receiving state, the control circuits 54 and 65 continue the processing of step S9 so as to monitor whether all of the optical axes enter the light receiving state.

If it is determined in step S9 that all of the optical axes are in the light receiving state, the control circuits 54 and 65 switch the direction check flags stored in the storage circuits 55 and 67 to ON (step S10), and the processing ends (or returns to the processing of step S1).

Note that other than the switching of the positional relationship of the trigger channels A1 and B1 (A2 and B2) for muting based on the processing for determining the conveyance direction of the work piece, processing that is similar to the processing of Embodiments 1 and 2 is performed.

Accordingly, even if the conveyance direction of the work piece is not set, the hazard sensing system S can determine the conveyance direction of the work piece automatically and perform processing.

Note that the installation position and number of the trigger channels are not limited to the positions and number indicated in the above-described embodiments. For example, in the above-described embodiments, the control circuits 54 and 65 may arbitrarily set the installation positions and number of trigger channels in the first mode and the second mode and store them in the storage circuits 55 and 67, and perform output corresponding to each of the trigger channels from the output circuit 69.

The present invention is not limited to the above-described embodiments, and various modifications are possible within the scope of the claims, and embodiments obtained by suitably combining the technical means proposed in the different embodiments are also included in the technical scope of the invention.

INDUSTRIAL APPLICABILITY

The present invention can be used in a sensor apparatus configured to sense a sensing target moving in a predetermined region, and a hazard sensing system including the sensor apparatus.

LIST OF REFERENCE NUMERALS

1 Hazard sensing sensor
5a, a Muting sensor (sensor apparatus, multi-optical-axis photoelectric sensor)
50 Light projector
51 Light emitting element
54 Control circuit (control unit)
58, 59 OR circuit (output unit)
60 Light receiver
61 Light receiving element
65 Control circuit (control unit)
69 Output circuit (output unit)
A1, B1, A2, B2 Trigger channel
C Conveyance device
D1 First optical axis
D2 Last optical axis
L1 Optical axis
LC Sensing area
S Hazard sensing system
W, W1, W2 Work piece (sensing target)

The invention claimed is:

1. A sensor apparatus comprising:
   a light projecting unit having a plurality of light emitting elements;
   a light receiving unit having a plurality of light receiving elements that correspond to the plurality of light emitting elements, each of the plurality of light receiving elements being configured to receive light emitted by a corresponding light emitting element and generate a light reception signal;
   a control unit having a first mode in which at least one of a plurality of optical axes formed by a corresponding at least one of the plurality of light emitting elements and the plurality of light receiving elements is set as a sensing optical axis, and a second mode in which an additional sensing optical axis is set as a sensing optical axis by adding an optical axis to the sensing optical axis in the first mode, the control unit being configured to determine a non-sensing state and a sensing state based on the light reception signal of each of the plurality of light receiving elements set as a sensing optical axis in respective ones of the first and second modes; and
   an output unit configured to perform output according to a determination result of the control unit of the non-sensing state and the sensing state,
   wherein the control unit switches to the second mode from the first mode when a change occurs in the first mode, the change corresponding to a change from the non-sensing state, in which the light reception signal of each of the plurality of light receiving elements for all of the sensing optical axes of the first mode correspond to a light receiving state, to the sensing state, in which the light reception signal of the one of the plurality of light receiving elements for the at least one of the sensing optical axes of the first mode corresponds to a blocked state.

2. The sensor apparatus according to claim 1, wherein the plurality of optical axes are aligned along a movement direction of a sensing target, and
   the additional sensing optical axis of the second mode is set to include an optical axis located in a direction opposite to the movement direction of the sensing target with respect to the sensing optical axis of the first mode.

3. The sensor apparatus according to claim 1, wherein the plurality of optical axes are aligned along a movement direction of a sensing target, and
   the additional sensing optical axis of the second mode is set to include an optical axis located in the movement direction of the sensing target with respect to the sensing optical axis of the first mode.

4. The sensor apparatus according to claim 1, wherein the plurality of light emitting elements and light receiving elements are linearly arranged in respective rows, and
   the light projecting unit and the light receiving unit are arranged such that the alignment direction of the light emitting elements and the alignment direction of the light receiving elements form an angle that is greater than 0 degrees and less than 90 degrees with respect to a movement direction of a sensing target.

5. The sensor apparatus according to claim 1, wherein the control unit switches to the first mode from the second mode when a change occurs in the second mode, the change corresponding to a change from a sensing state, in which the light reception signal of the light receiving element for at least one of the sensing optical axes of the second mode corresponds to a blocked state, to a non-sensing state, in which the light reception signal of each of the plurality of light receiving elements of all of the sensing optical axes in the first mode corresponds to a light receiving state.

6. The sensor apparatus according to claim 1, wherein the control unit is configured to set a plurality of sensing optical axes of the first mode at a plurality of positions with different optical axes, and in the second mode, the control unit is configured to set the plurality of sensing optical axes of the second mode, which are obtained by adding optical axes other than the sensing optical axes of the first mode to the plurality of sensing optical axes of the first mode, and the output unit outputs the determination results corresponding to the plurality of sensing optical axes.

7. The sensor apparatus according to claim 4, wherein in the first mode, the sensing optical axis includes a plurality of optical axes and the control unit determines that a sensing target has been sensed when a predetermined number of the sensing optical axes are blocked in the first mode, and in the second mode, the control unit determines that a sensing target has been sensed when one of the sensing optical axes is blocked.

8. A hazard sensing system comprising:

a hazard sensing sensor; and the sensor apparatus according to claim 1, in which the output unit is configured to perform output corresponding to the determination result in a muting input of the hazard sensing sensor.

* * * * *